United States Patent
Kanoh

(10) Patent No.: US 11,396,297 B2
(45) Date of Patent: Jul. 26, 2022

(54) VEHICLE CONTROL SYSTEM, VEHICLE CONTROL METHOD, AND PROGRAM

(71) Applicant: HONDA MOTOR CO., LTD., Tokyo (JP)

(72) Inventor: Tadahiko Kanoh, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/970,983

(22) PCT Filed: Feb. 26, 2018

(86) PCT No.: PCT/JP2018/006918
§ 371 (c)(1),
(2) Date: Aug. 19, 2020

(87) PCT Pub. No.: WO2019/163121
PCT Pub. Date: Aug. 29, 2019

(65) Prior Publication Data
US 2020/0398849 A1   Dec. 24, 2020

(51) Int. Cl.
*B60W 30/18* (2012.01)
*B60W 10/20* (2006.01)
(Continued)

(52) U.S. Cl.
CPC ...... *B60W 30/18163* (2013.01); *B60W 10/20* (2013.01); *B60W 30/0956* (2013.01);
(Continued)

(58) Field of Classification Search
CPC ........... B60W 30/18163; B60W 10/20; B60W 30/0956; B60W 40/04; B60W 40/08;
(Continued)

(56) References Cited

U.S. PATENT DOCUMENTS

| 9,775,004 | B2* | 9/2017 | Cawse | G08G 1/20 |
| 2005/0015203 | A1* | 1/2005 | Nishira | G08G 1/167 701/301 |

(Continued)

FOREIGN PATENT DOCUMENTS

| CN | 104221066 | 12/2014 |
| CN | 106062853 | 10/2016 |

(Continued)

OTHER PUBLICATIONS

Japanese Office Action for Japanese Patent Application No. 2020-501976 dated Jun. 1, 2021.
(Continued)

*Primary Examiner* — Hussein Elchanti
(74) *Attorney, Agent, or Firm* — Amin, Turocy & Watson, LLP

(57) ABSTRACT

A vehicle control system includes: a recognizer configured to recognize a surrounding situation of an own vehicle; a determiner configured to determine whether a condition for lane changing of the own vehicle from an own lane to an adjacent lane is satisfied based on the surrounding situation recognized by the recognizer; and a traveling controller configured to control steering and a deceleration or acceleration speed of the own vehicle and perform lane-changing control to change the own lane to the adjacent lane when the determiner determines that the condition is satisfied. The lane-changing control is inhibited when a speed of the own vehicle is equal to or less than a predetermined speed.

10 Claims, 13 Drawing Sheets

(51) Int. Cl.
*B60W 30/095* (2012.01)
*B60W 40/04* (2006.01)
*B60W 40/08* (2012.01)
*B60W 40/105* (2012.01)
*G08G 1/16* (2006.01)
*B60W 10/04* (2006.01)
*B60W 10/18* (2012.01)

(52) U.S. Cl.
CPC ............ *B60W 40/04* (2013.01); *B60W 40/08* (2013.01); *B60W 40/105* (2013.01); *G08G 1/16* (2013.01); *B60W 10/04* (2013.01); *B60W 10/18* (2013.01); *B60W 2520/00* (2013.01); *B60W 2555/00* (2020.02)

(58) Field of Classification Search
CPC ........... B60W 40/105; B60W 2555/00; B60W 10/04; B60W 10/18; B60W 2520/00; G08G 1/16
See application file for complete search history.

(56) References Cited

U.S. PATENT DOCUMENTS

| | | | | |
|---|---|---|---|---|
| 2010/0161192 | A1* | 6/2010 | Nara | ...................... G01C 21/26 701/70 |
| 2016/0311464 | A1 | 10/2016 | Yamaoka | |
| 2017/0018189 | A1* | 1/2017 | Ishikawa | .............. G05D 1/0088 |
| 2017/0336797 | A1* | 11/2017 | Abe | ................... G06K 9/00335 |
| 2018/0354510 | A1* | 12/2018 | Miyata | .................. B60W 50/14 |
| 2018/0354518 | A1* | 12/2018 | Inou | ..................... G05D 1/0214 |
| 2019/0071099 | A1* | 3/2019 | Nishiguchi | ......... B62D 15/0255 |
| 2019/0072970 | A1* | 3/2019 | Izumori | ............... G05D 1/0257 |
| 2019/0084572 | A1* | 3/2019 | Oishi | .................... B60W 10/00 |
| 2019/0143983 | A1* | 5/2019 | Hashimoto | .......... G05D 1/0088 701/23 |
| 2019/0329780 | A1* | 10/2019 | Tomescu | ............... B60W 30/09 |
| 2020/0050195 | A1* | 2/2020 | Gross | ............. B60W 60/00272 |
| 2020/0398849 | A1* | 12/2020 | Kanoh | .................. B60W 40/08 |

FOREIGN PATENT DOCUMENTS

| | | |
|---|---|---|
| CN | 106335509 | 1/2017 |
| CN | 107415830 | 12/2017 |
| JP | 2000-020898 | 1/2000 |
| JP | 2004-210109 | 7/2004 |
| JP | 2009-274594 | 11/2009 |
| JP | 2016-197390 | 11/2016 |
| JP | 2016-207060 | 12/2016 |
| JP | 2017-019358 | 1/2017 |
| JP | 2017-102519 | 6/2017 |
| JP | 2017-114195 | 6/2017 |
| JP | 2017-539009 | 12/2017 |
| WO | 2016/081488 | 5/2016 |
| WO | 2017/010344 | 1/2017 |
| WO | 2017/141788 | 8/2017 |
| WO | 2017/168541 | 10/2017 |

OTHER PUBLICATIONS

International Search Report and Written Opinion for International Application No. PCT/JP2018/006918 dated May 29, 2018 6 pages.
Chinese Office Action for Chinese Patent Application No. 201880089956.X dated Dec. 16, 2021.

* cited by examiner

VEHICLE CONTROL SYSTEM, VEHICLE CONTROL METHOD, AND PROGRAM

TECHNICAL FIELD

The present invention relates to a vehicle control system, a vehicle control method, and a program.

BACKGROUND ART

A technology for determining whether a lane can be changed based on a relative speed or a relative distance with respect to another vehicle which is located in a lane of a lane-changing destination when an own vehicle changes its lane has been disclosed (for example, see Patent Document 1).

PRIOR ART DOCUMENTS

Patent Documents

Patent Document 1: Japanese Unexamined Patent Application, First Publication No. 2000-20898

SUMMARY OF INVENTION

Problems to be Solved by the Invention

However, since there is a limitation on a detection range of a sensor detecting an object such as another vehicle, when no other vehicle is located in the lane of the lane-changing destination and it is determined that the lane can be changed and when a speed of another vehicle located outside of the detection range of the sensor in the lane of the lane-changing destination is faster and a speed of the own vehicle is slower, a situation in which the lane ought not to be changed occurs in some cases.

The present invention is devised in view of such circumstances and an objective of the present invention is to provide a vehicle control system, a vehicle control method, and a program capable of changing a lane in accordance with a traveling situation of a lane-changing destination.

Solution to Problem (1) A vehicle control system includes: a recognizer configured to recognize a surrounding situation of an own vehicle; a determiner configured to determine whether a condition for lane changing of the own vehicle from an own lane to an adjacent lane is satisfied based on the surrounding situation recognized by the recognizer; and a traveling controller configured to control steering and a deceleration or acceleration speed of the own vehicle and perform lane-changing control to change the own lane to the adjacent lane when the determiner determines that the condition is satisfied. Wherein the lane-changing control is inhibited when a speed of the own vehicle is equal to or less than a predetermined speed.

(2) The vehicle control system described in (1) may further include an inhibition controller configured to inhibit lane-changing control performed by the traveling controller when the speed of the own vehicle is equal to or less than the predetermined speed.

(3) The vehicle control system described in (1) may further include an inhibition controller configured to inhibit the lane-changing control by inhibiting a determination process performed by the determiner determining whether the condition is satisfied when the speed of the own vehicle is equal to or less than the predetermined speed.

(4) In the vehicle control system according to (2) or (3), the inhibition controller may derive a standard speed serving as a standard of the adjacent lane based on the surrounding situation recognized by the recognizer and may not inhibit the lane-changing control by the traveling controller when a difference between the derived standard speed and the speed of the own vehicle is equal to or less than a threshold.

(5) The vehicle control system described in any one of (2) to (4) may further include an operator operated by an occupant of the own vehicle and configured to adjust a movement direction of the own vehicle; and a detector configured to detect that the occupant is operating the operator. The inhibition controller may not inhibit the lane-changing control by the traveling controller when the detector detects that the operator is being operated. The inhibition controller may inhibit the lane-changing control by the traveling controller when the detector does not detect that the operator is being operated.

(6) The vehicle control system described in any one of (2) to (5) may further include an operator operated by an occupant of the own vehicle. The inhibition controller may not inhibit the lane-changing control by the traveling controller when a control mode of the own vehicle is a first mode in which the occupant is requested to operate the operator. The inhibition controller may inhibit the lane-changing control by the traveling controller when the control mode of the own vehicle is a second mode in which the occupant is not requested to operate the operator.

(7) The vehicle control system described in any one of (2) to (6) may further include an operator operated by an occupant of the own vehicle. The inhibition controller may inhibit the lane-changing control by the traveling controller until transition of a control mode of the own vehicle from a second mode in which the occupant is not requested to operate the operator to a first mode in which the occupant is requested to operate the operator when the control mode of the own vehicle is the second mode, the determiner determines that the condition is satisfied, and the speed of the own vehicle is equal to or less than the predetermined speed. The inhibition controller may not inhibit the lane-changing control and may cause the traveling controller to perform the lane-changing control when the control mode of the own vehicle transitions from the second mode to the first mode.

(8) The vehicle control system described in (6) or (7) may further include a detector configured to detect that the occupant is operating the operator; and a switching controller configured to switch the control mode of the own vehicle between the first and second modes based on at least one of a recognition result by the recognizer and a detection result by the detector.

(9) In the vehicle control system described in any one of (2) to (8), the determiner may determine whether the condition is satisfied under a situation in which another vehicle is located in front of the own vehicle in the own lane when the recognizer recognizes that the other vehicle is located in front of the own vehicle in the own lane. The inhibition controller may inhibit the lane-changing control by the traveling controller when the determiner determines that the condition is satisfied under the situation in which the other vehicle is located in front of the own vehicle in the own lane and the speed of the own vehicle is equal to or less than the predetermined speed.

(10) A vehicle control method causes an in-vehicle computer to: recognize a surrounding situation of an own vehicle; determine whether a condition for lane changing of the own vehicle from an own lane to an adjacent lane is satisfied based on the recognized surrounding situation; control steering and a deceleration or acceleration speed of the own vehicle and perform lane-changing control to change the own lane to the adjacent lane when the condition is determined to be satisfied; and inhibit the lane-changing control when a speed of the own vehicle is equal to or less than a predetermined speed.

(11) A program causes an in-vehicle computer to: recognize a surrounding situation of an own vehicle; determine whether a condition for lane changing of the own vehicle from an own lane to an adjacent lane is satisfied based on the recognized surrounding situation; control steering and a deceleration or acceleration speed of the own vehicle and perform lane-changing control to change the own lane to the adjacent lane when the condition is determined to be satisfied; and inhibit the lane-changing control when a speed of the own vehicle is equal to or less than a predetermined speed.

Advantageous Effects of Invention

According to (1) to (11), it is possible to change a lane in accordance with a traveling situation of a lane-changing destination.

DESCRIPTION OF EMBODIMENTS

Hereinafter, embodiments of a vehicle control system, a vehicle control method, and a program according to the present invention will be described with reference to the drawings.

First Embodiment

[Overall Configuration]

Figure 1:
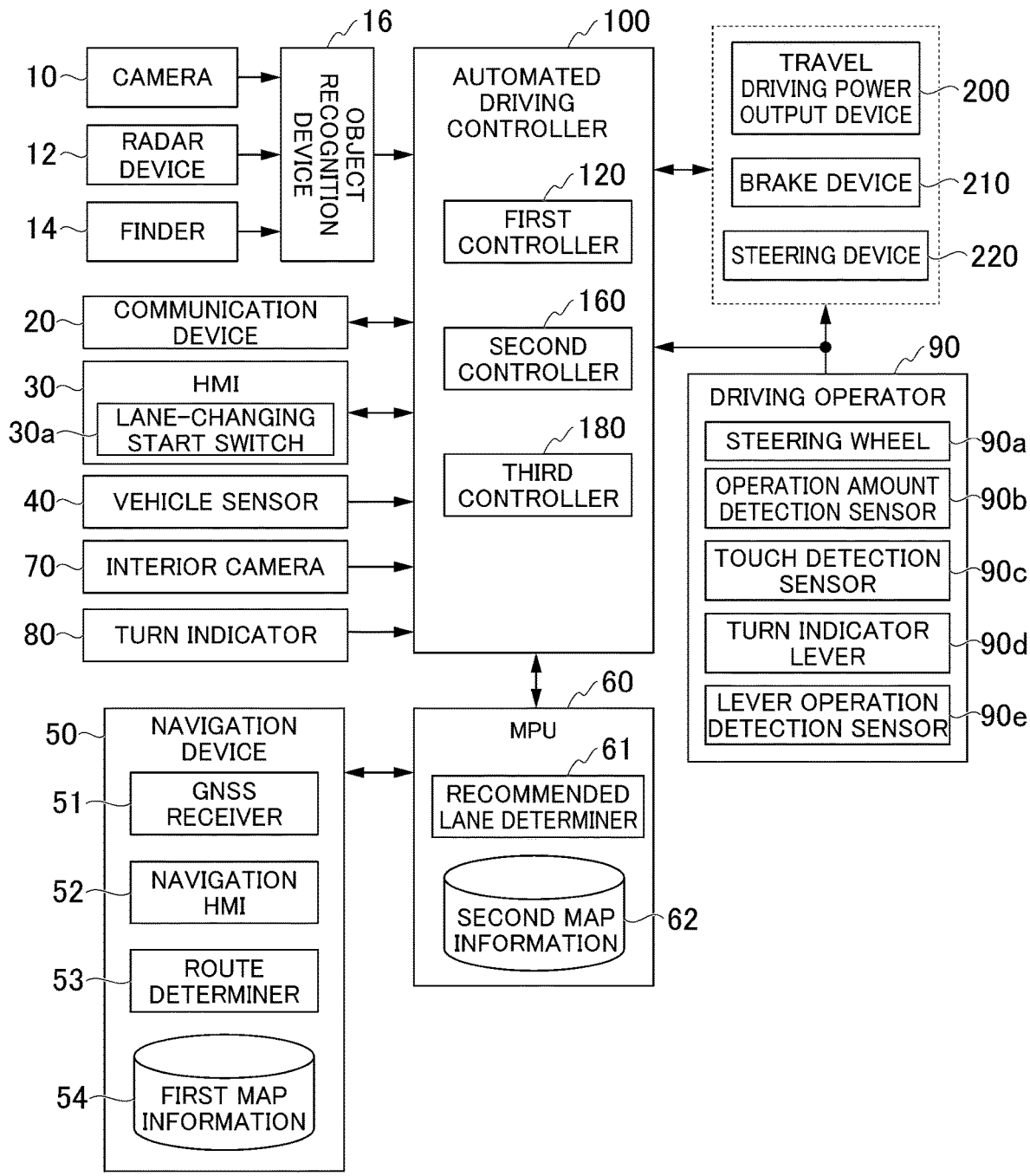
FIG. 1 is a diagram illustrating a configuration of a vehicle system 1 in which a vehicle control system according to a first embodiment is used.

FIG. 1 is a diagram illustrating a configuration of a vehicle system 1 in which a vehicle control system according to a first embodiment is used. A vehicle in which the vehicle system 1 is mounted is (hereinafter referred to as an own vehicle M), for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, or a combination thereof. When the electric motor is included, the electric motor operates using power generated by a power generator connected to the internal combustion engine or power discharged from a secondary cell or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, an interior camera 70, a turn indicator (direction indicator) 80, a driving operator 90, an automated driving controller 100, a travel driving power output device 200, a brake device 210, and a steering device 220. The devices and units are connected to one another via a multiplex communication line such as a controller area network (CAN) communication line, a serial communication line, or a wireless communication network. The configuration shown in FIG. 1 is merely exemplary, a part of the configuration may be omitted, and another configuration may be further added.

The camera 10 is, for example, a digital camera that uses a solid-state image sensor such as a charge-coupled device (CCD) or a complementary metal-oxide semiconductor (CMOS). One camera 10 or a plurality of cameras 10 are mounted on any portion of the own vehicle M. When the camera 10 images a front side, the camera 10 is mounted on an upper portion of a front windshield, a rear surface of a rearview mirror, or the like. For example, the camera 10 repeatedly images the surroundings of the own vehicle M periodically. The camera 10 may be a stereo camera.

The radar device 12 radiates radio waves such as millimeter waves to the surroundings of the own vehicle M and detects radio waves (reflected waves) reflected from an object to detect at least a position (a distance from and an azimuth of) of the object. One radar device 12 or a plurality of radar devices 12 are mounted on any portion of the own vehicle M. The radar device 12 may detect a position and a speed of an object in conformity with a frequency-modulated continuous wave (FM-CW) scheme.

The finder 14 is a light detection and ranging (LIDAR) finder. The finder 14 radiates light to the surroundings of the own vehicle M and measures scattered light. The finder 14 detects a distance to a target based on a time from light emission to light reception. The radiated light is, for example, pulsed laser light. One finder 14 or a plurality of finders 14 are mounted on any portions of the own vehicle M.

The object recognition device 16 performs a sensor fusion process on detection results from some or all of the camera 10, the radar device 12, and the finder 14 and recognizes a position, a type, a speed, a movement direction, and the like of an object. The recognized object is, for example, a type of object such as a vehicle, a guide rail, an electric pole, a pedestrian, or a traffic sign. The object recognition device 16 outputs a recognition result to the automated driving controller 100. The object recognition device 16 may output detection results of the camera 10, the radar device 12, and the finder 14 to the automated driving controller 100 without any change.

The communication device 20 communicates with another vehicle around the own vehicle M or various server devices via radio base stations using, for example, a cellular network, a Wi-Fi network, Bluetooth (registered trademark), dedicated short-range communication (DSRC) or the like.

The HMI 30 presents various types of information to occupants of the own vehicle M and receives input operations by the occupants. The HMI 30 includes, for example, various display devices such as a liquid crystal display (LCD) or an organic electroluminescence (EL) display, various buttons such as a lane-changing start switch 30a, speakers, buzzers, and touch panels. Each device of the HMI 30 is mounted on, for example, any portion of each unit of an instrument panel, a front seat or a rear seat. The lane-changing start switch 30a is a switch for starting control such that the own vehicle M is caused to change its lane without operating a steering wheel 90a by an occupant (hereinafter referred to as an automated lane changing). A turn indicator lever 90d to be described below may also function as a switch for starting the automated lane changing or.

The vehicle sensor 40 includes a vehicle speed sensor that detects a speed $V_M$ of the own vehicle M, an acceleration sensor that detects acceleration, a yaw rate sensor that detects angular velocity around a vertical axis, and an azimuth sensor that detects a direction of the own vehicle M. Each sensor included in the vehicle sensor 40 outputs a detection signal indicating a detection result to the automated driving controller 100.

The navigation device 50 includes, for example, a global navigation satellite system (GNSS) receiver 51, a navigation HMI 52, and a route determiner 53 and retains first map information 54 in a storage device such as a hard disk drive (HDD) or a flash memory. The GNSS receiver 51 specifies a position of the own vehicle M based on signals received from GNSS satellites. The position of the own vehicle M may be specified or complemented by an inertial navigation system (INS) using an output of the vehicle sensor 40. The navigation HMI 52 includes a display device, a speaker, a touch panel, and a key. The navigation HMI 52 may be partially or entirely common to the above-described HMI 30. The route determiner 53 determines, for example, a route from a position of the own vehicle M specified by the GNSS receiver 51 (or any input position) to a destination input by the occupant using the navigation HMI 52 (hereinafter referred to as a route on a map) with reference to the first map information 54. The first map information 54 is, for example, information in which a road shape is expressed by links indicating roads and nodes connected by the links. The first map information 54 may include curvatures of roads and point of interest (POI) information. The route on the map determined by the route determiner 53 is output to the MPU 60. The navigation device 50 may perform route guidance using the navigation HMI 52 based on the route on the map determined by the route determiner 53. The navigation device 50 may be realized by, for example, a function of a terminal device such as a smartphone or a tablet terminal possessed by the occupant. The navigation device 50 may transmit a present position and a destination to a navigation server via the communication device 20 to acquire the same route as the route on the map replied from the navigation server.

The MPU 60 functions as, for example, a recommended lane determiner 61 and retains second map information 62 in a storage device such as an HDD or a flash memory. The recommended lane determiner 61 divides the route provided from the navigation device 50 into a plurality of blocks (for example, divides the route in a vehicle movement direction for each 100 [m]) and determines a recommended lane for each block with reference to the second map information 62. The recommended lane determiner 61 determines in which lane the vehicle travels from the left. When there is a branching location in the route, a joining spot, or the like, the recommended lane determiner 61 determines a recommended lane so that the own vehicle M can travel in a reasonable route to move to a branching destination.

The second map information 62 is map information that has higher precision than the first map information 54. The second map information 62 includes, for example, information regarding the middles of lanes or information regarding boundaries of lanes. The second map information 62 may include road information, traffic regulation information, address information (address and postal number), facility information, and telephone number information. The second map information 62 may access another device using the communication device 20 to be updated frequently.

For example, the interior camera 70 performs imaging centering on a face of an occupant (in particular, an occupant sitting on a driving seat) sitting on a seat installed inside the vehicle. The interior camera 70 is a digital camera in which a solid-state image sensor such as a CCD or a CMOS is used. For example, the interior camera 70 images the occupant periodically. An image captured and generated by the interior camera 70 is output to the automated driving controller 100.

The driving operator 90 includes, for example, various types of operators such as the steering wheel 90a, a plurality of operation amount detection sensors 90b, a touch detection sensor 90c, a turn indicator lever (direction indication switch) 90d operating the turn indicator 80, a lever operation detection sensor 90e, an accelerator pedal, a brake pedal, and a shift lever. The steering wheel 90a is an example of an "operator."

For example, the operation amount detection sensor 90b that detects an operation amount of an operation by the occupant is fitted in each operator of the driving operator 90. For example, the operation amount detection sensor 90b fitted in the steering wheel 90a detects a steering angle, a steering torque, or the like of the steering wheel and the operation amount detection sensor 90b fitted in the accelerator pedal or the brake pedal detects a step amount of each pedal. Each operation amount detection sensor 90b outputs a detection signal indicating a detection result to the automated driving controller 100, the travel driving power output device 200, and one or both of the brake device 210 and the steering device 220. The operation amount detection sensor 90b is an example of a "detector."

The touch detection sensor 90c is fitted in the steering wheel 90a. The touch detection sensor 90c is, for example, an electrostatic capacitance sensor that is provided along the circumferential direction of the steering wheel 90a. The touch detection sensor 90c detects an approach or a touch of an object to the steering wheel 90a as a change in electrostatic capacitance. The touch detection sensor 90c outputs a predetermined detection signal to the automated driving controller 100 when the detected electrostatic capacitance is equal to or greater than a threshold. The threshold is set to, for example, a value lower than electrostatic capacitance generated when the occupant grasps the steering wheel 90a. The touch detection sensor 90c may output a detection signal indicating the electrostatic capacitance to the automated driving controller 100 irrespective of whether the electrostatic capacitance is equal to or greater than the threshold. The touch detection sensor 90c is an example of a "detector."

The lever operation detection sensor 90e detects that the turn indicator lever 90d is operated and outputs a detection signal indicating the detection result to the automated driving controller 100.

The automated driving controller 100 includes, for example, a first controller 120, a second controller 160, and a third controller 180. Each constituent element of the first controller 120, the second controller 160, and the third controller 180 is realized, for example, by causing a hardware processor such as a central processing unit (CPU) to execute a program (software). Some or all of the constituent elements may be realized by hardware (a circuit unit including circuitry) such as a large-scale integration (LSI), an application-specific integrated circuit (ASIC), a field-programmable gate array (FPGA), or a graphics-processing unit (GPU) or may be realized by software and hardware in cooperation. The details of the automated driving controller 100 will be described below.

The travel driving power output device 200 outputs travel driving power (toque) for causing a vehicle to travel to a driving wheel. The travel driving power output device 200 includes, for example, a combination of an internal combustion engine, an electric motor, and a transmission and a power electronic control unit (ECU) controlling them. The ECU controls the foregoing configuration in accordance with information input from the second controller 160 or information input from the driving operator 90.

The brake device 210 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the second controller 160 or information input from the driving operator 90 such that a brake torque in accordance with a brake operation is output to each wheel. The brake device 210 may include a mechanism that transmits a hydraulic pressure generated in response to an operation of the brake pedal 84 included in the driving operator 90 to the cylinder via a master cylinder as a backup. The brake device 210 is not limited to the above-described configuration and may be an electronic control type hydraulic brake device that controls an actuator in accordance with information input from the second controller 160 such that a hydraulic pressure of the master cylinder is transmitted to the cylinder.

The steering device 220 includes, for example, a steering ECU and an electric motor. The electric motor works a force to, for example, a rack and pinion mechanism to change a direction of a steering wheel. The steering ECU drives the electric motor to change the direction of the steering wheel in accordance with information input from the second controller 160 or information input from the driving operator 90.

[Functional Configuration of Automated Driving Controller]

Figure 2:
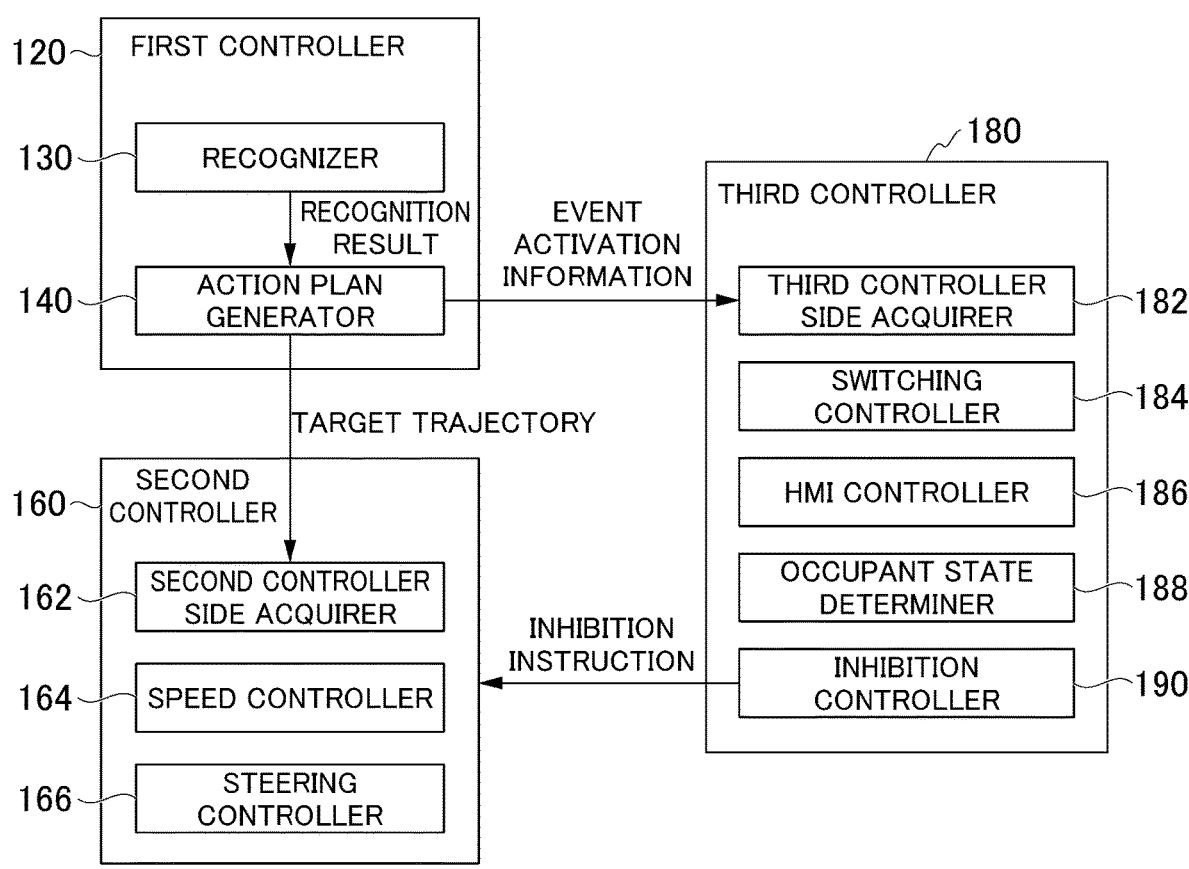
FIG. 2 is a diagram illustrating a functional configuration of an automated driving controller 100.

FIG. 2 is a diagram illustrating a functional configuration of the automated driving controller 100. The first controller 120 includes, for example, a recognizer 130 and an action plan generator 140. The action plan generator 140 is an example of a "determiner."

The first controller 120 realizes, for example, a function by artificial intelligence (AI) and a function by a model (a learning machine such as a neural network) given in advance in parallel. For example, a function of "recognizing an intersection" may be realized by performing recognition of an intersection by deep learning or the like and recognition based on a condition given in advance (a signal, a road sign, or the like which can be subjected to pattern matching) in parallel, scoring both the recognitions, and performing evaluation comprehensively. Thus, reliability of driving support is guaranteed.

The recognizer 130 recognizes states such as a position, a speed, acceleration, or the like of an object near the own vehicle M based on information input from the camera 10, the radar device 12, and the finder 14 via the object recognition device 16. For example, the position of the object is recognized as a position on the absolute coordinates in which a representative point (a center of gravity, a center of a driving shaft, or the like) of the own vehicle M is the origin. The position of the object may be represented as a representative point such as a center of gravity, a corner, or the like of the object or may be represented as expressed regions. A "state" of an object may include both an acceleration or jerk of the object or an "action state" (for example, whether a vehicle is changing a lane or is attempting to change the lane). The recognizer 130 recognizes the shape of a curve in which the own vehicle M passes from now based on images captured by the camera 10. The recognizer 130 converts the shape of the curve into an actual plane using the images captured by the camera 10 and outputs, for example, 2-dimensional point sequence information or information expressed using a model equal to the 2-dimensional point sequence information as information expressing the shape of the curve to the action plan generator 140.

The recognizer 130 recognizes, for example, a lane in which the own vehicle M is traveling (a traveling lane) and a relative position and a posture of the own vehicle M with respect to the traveling lane. For example, the recognizer 130 recognizes demarcation lines LM on a road from an image captured by the camera 10 and a lane demarcated by two demarcation lines LM closest to the own vehicle M among the recognized demarcation lines LM as a traveling lane. The recognizer 130 recognizes a position or a posture of the own vehicle M with respect to the recognized traveling lane.

Figure 3:
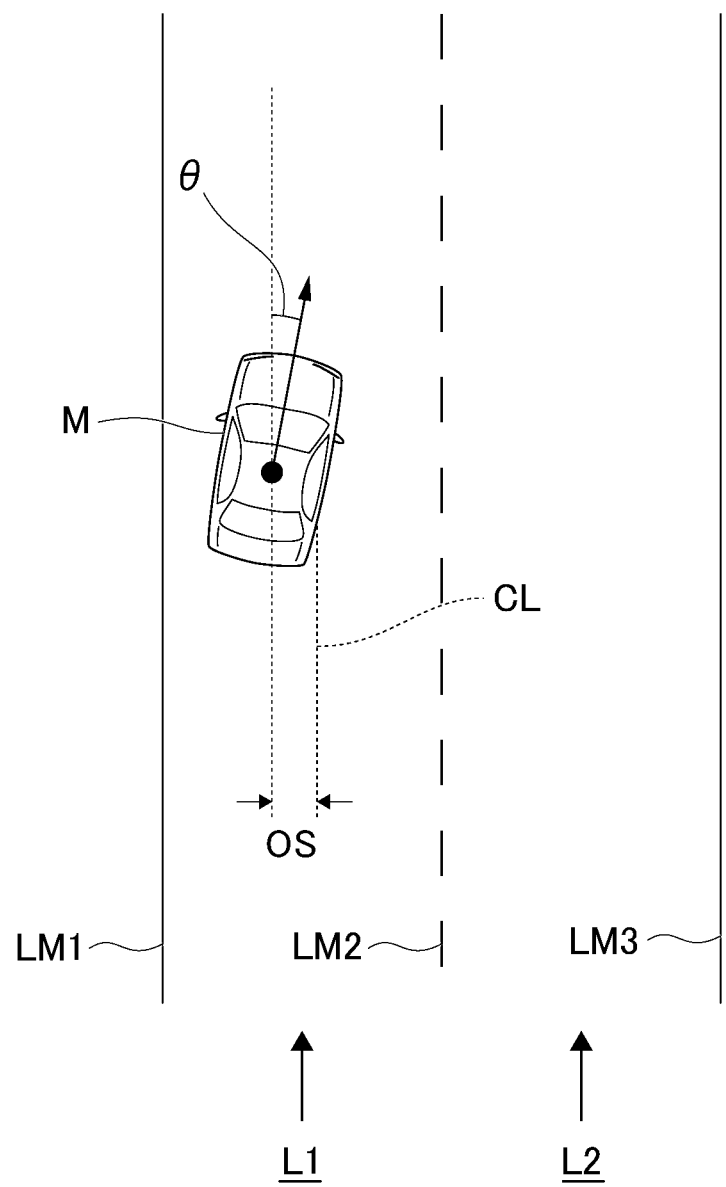
FIG. 3 is a diagram illustrating an aspect in which a relative position and a posture of an own vehicle M with respect to a traveling lane are cognized by a recognizer 130.

FIG. 3 is a diagram illustrating an aspect in which a relative position and a posture of the own vehicle M with respect to a traveling lane are recognized by the recognizer 130. For example, the recognizer 130 recognizes demarcation lines LM1 to LM3 and recognizes a region between demarcation lines LM1 and LM2 closest to the own vehicle M as a traveling lane L1 of the own vehicle M. Then, the recognizer 130 a separation OS from a traveling lane center CL of a standard point (for example, a center of gravity) of the own vehicle M and an angle θ formed with a line formed along the traveling lane center CL in the movement direction of the own vehicle M as a relative position and a posture of the own vehicle M with respect to the traveling lane L1. Instead of this, the recognizer 130 may recognize the position of the standard point or the like of the own vehicle M with respect to one lateral end of the own lane L1 as a relative position of the own vehicle M with respect to the traveling lane.

The recognizer 130 may recognize, for example, an adjacent lane which is adjacent to the own vehicle. For example, the recognizer 130 recognizes a region between a demarcation line close to the own vehicle M next to the demarcation lines demarcating the own lane and the demarcation line of the own vehicle as an adjacent lane. In the example of FIG. 2, for example, the recognizer 130 recognizes a region between the demarcation line LM2 of the own lane and the demarcation line LM3 close to the own vehicle M next to the demarcation line LM2 as a right adjacent lane L2.

The recognizer 130 may recognize a traveling lane by recognizing boundaries (road boundaries) including road demarcation lines or shoulders, curbstones, median strips, and guardrails without being limited to road demarcation lines. In this recognition, the position of the own vehicle M acquired from the navigation device 50 or a process result by INS may be added. The recognizer 130 may recognize temporary stop lines, obstacles, red signals, toll gates, and other road events.

The action plan generator 140 plans events that are sequentially activated in a route along which a recommended lane is determined so that the own vehicle M is traveling along a recommended lane determined by the recommended lane determiner 61 and can handle a surrounding situation of the own vehicle M in principle. The events include, for example, a lane-changing event for causing the own vehicle M to change a line from an own lane to an adjacent lane, a joining event for causing the own vehicle M to join a main lane at a joining spot, a branching event for causing the own vehicle M to branch to a lane of a destination lane at a branching spot of a road, a constant speed traveling event in which a vehicle is traveling in the same lane at a constant speed, and a following traveling event for causing the own vehicle M to follow another vehicle (hereinafter referred to as a front vehicle) which is within a predetermined distance (for example, about 100 [m]) in front of the own vehicle M. The "following" is, for example, a traveling aspect in which a relative distance (an inter-vehicle distance) between the own vehicle M and a front vehicle is maintained constantly. The events may include, for example, an overtaking event in which the own vehicle M is caused to change its lane to an adjacent lane for the moment, take over a front vehicle in the adjacent lane, and change its lane to the original lane again, an avoiding event in which braking and/or steering is performed to avoid approach to an obstacle, a curve traveling event in which a vehicle is traveling in a curve, a passing event in which a vehicle passes a predetermined point such as an intersection, a crosswalk, or a railroad crossing, and an automated stopping event, and a overtaking event in which automated driving ends to switch to manual driving.

The action plan generator 140 changes a previously determined event to another event or plans a new event in accordance with a surrounding situation recognized by the recognizer 130 when the own vehicle M is traveling. For example, when the own vehicle M is traveling in a section in which a constant speed traveling event is planned, an inter-vehicle distance between a front vehicle and the own vehicle M is less than a predetermined distance, and the recognizer 130 recognizes an adjacent lane, the action plan generator 140 may change the constant speed traveling event to an overtaking event.

When the lever operation detection sensor 90e detects that the turn indicator lever 90d is operated or the lane-changing start switch 30a is operated, the action plan generator 140 may change a currently activated event or an event planned after the current activated event to the lane-changing event.

The action plan generator 140 generates a target trajectory in which the own vehicle M will travel in future in accordance with each event. The target trajectory includes, for example, a speed element. For example, the target trajectory is expressed by arranging spots (trajectory points) at which the own vehicle M will arrive in sequence. The trajectory point is a spot at which the own vehicle M will arrive for each predetermined traveling distance (for example, about several [m]) for a distance along a road. Apart from the trajectory points, target acceleration and a target speed are generated as parts of the target trajectory for each of predetermined sampling times (for example, about every fraction of a second). The trajectory point may be a position at which the own vehicle M will arrive at the sampling time for each predetermined sampling time. In this case, information regarding the target acceleration or the target speed is expressed according to an interval between the trajectory points.

For example, when the own vehicle M arrives at a section in which the lane-changing event is planned or a section in which an event followed by lane changing, such as a joining event, a branching event, or an overtaking event, is planned, the action plan generator 140 activates such various events and generates a target trajectory for causing the own vehicle M to change its lane.

For example, the action plan generator 140 sets a target position for a lane-changing destination in an adjacent lane (hereinafter referred to as a lane-changing target position TA) and determines whether another vehicle is located as an obstacle at the lane-changing target position TA.

Figure 4:
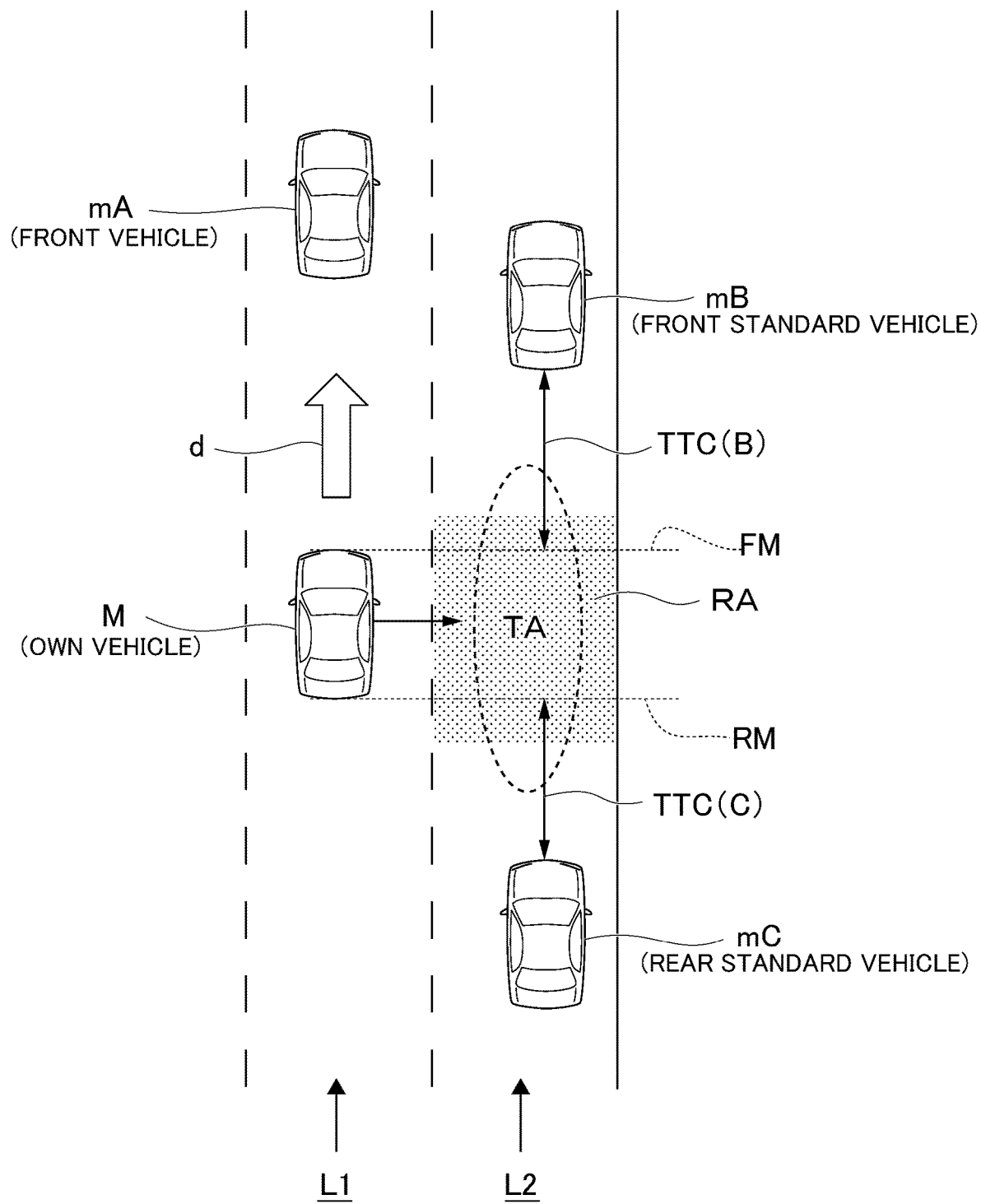
FIG. 4 is a diagram schematically illustrating an aspect in which a lane-changing target position TA is set in an adjacent lane.

FIG. 4 is a diagram schematically illustrating an aspect in which a lane-changing target position TA is set in an adjacent lane. In the drawing, L1 denotes an own lane and L2 denotes a right adjacent lane. An arrow d indicates a movement (traveling) direction of the own vehicle M. For example, the action plan generator 140 selects any two other vehicles (for example, two vehicles relatively close to the own vehicle M) among one or more other vehicles traveling in the adjacent lane L2 of a lane-changing destination, which is an adjacent lane adjacent to the own lane L1 in which the own vehicle M is traveling and sets a space between the selected two other vehicles as a lane-changing target position TA. For example, the lane-changing target position TA is set in the middle of the adjacent lane. Hereinafter, another vehicle located immediately before the set lane-changing target position TA is referred to as a "front standard vehicle mB" and other vehicle located immediately after the lane-changing target position TA is referred to as a "rear standard vehicle mC." The lane-changing target position TA is a relative position based on a positional relation between the own vehicle M, and the front standard vehicle mB and the rear standard vehicle mC.

After the action plan generator 140 sets the lane-changing target position TA, the action plan generator 140 sets a prohibition region RA illustrated in the drawing based on a set position of the lane-changing target position TA. For example, the action plan generator 140 projects the own vehicle M to the adjacent lane L2 of the lane-changing destination and sets a region in which there are slight margin distances before and after the projected own vehicle M as the prohibition region RA. The prohibition region RA is set as a region extending from one demarcation line LM demarcating the adjacent lane L2 to the other demarcation line LM.

The action plan generator 140 determines that another vehicle is not located as an obstacle in the lane-changing target position TA when not even a part of another vehicle is located in the set prohibition region RA, a collision allowance time time-to-collision (TTC)(B) between the own vehicle M and the front standard vehicle mB is greater than a threshold Th(B), and a collision allowance time TTC(C) between the own vehicle M and the rear standard vehicle mC is greater than a threshold Th(C). The phrase "even a part of the other vehicle is not located in the prohibition region RA" means for example, that the prohibition region RA and a region indicating the other vehicle do not overlap each other when viewed from above. The collision allowance time TTC(B) is derived, for example, by dividing a distance between the front standard vehicle mB and an extension line FM in which the front end of the own vehicle M is virtually extended to the side of the adjacent lane L2 by a relative speed between the own vehicle M and the front standard vehicle mB. The collision allowance time TTC(C) is derived, for example, by dividing a distance between the rear standard vehicle mC and an extension line RM in which the rear end of the own vehicle M is virtually extended to the side of the adjacent lane L2 by a relative speed between the own vehicle M and the rear standard vehicle mC. The thresholds Th(B) and Th(C) may be the same value or may be different values.

When it is determined that another vehicle is located as an obstacle in the lane-changing target position TA, the action plan generator 140 repeatedly performs a process of determining whether the other vehicle is located in the lane-changing target position TA by selecting two other vehicles among other vehicles located in the right adjacent lane L2 and newly setting the lane-changing target position TA. At this time, the automated driving controller 100 may generate a target trajectory for causing the own vehicle M to wait in the own lane until the lane-changing target position TA at which no other vehicle is located is set. When the own vehicle M is caused to wait in the own lane, the action plan generator 140 may determine a currently maintained speed of the own vehicle M, a speed at which an inter-vehicle distance from the front vehicle mA is constant, or a speed at which the own vehicle M moves to a lateral side of the lane-changing target position TA as a target speed included as a speed element in a target trajectory.

When no one vehicle is located in the adjacent lane L2 at the time of setting of the lane-changing target position TA, the action plan generator 140 may determine that no other vehicle is located as an obstacle in the lane-changing target position TA since no other interfering vehicles are located in the prohibition region RA. When only one other vehicle is located in the adjacent lane L2 at the time of setting of the lane-changing target position TA, the action plan generator 140 may set any position in front of or to the rear of the other vehicle as the lane-changing target position TA.

The action plan generator 140 generates a target trajectory for changing the lane when it is determined that no other vehicle is located as an obstacle in the lane-changing target position TA.

Figure 5:
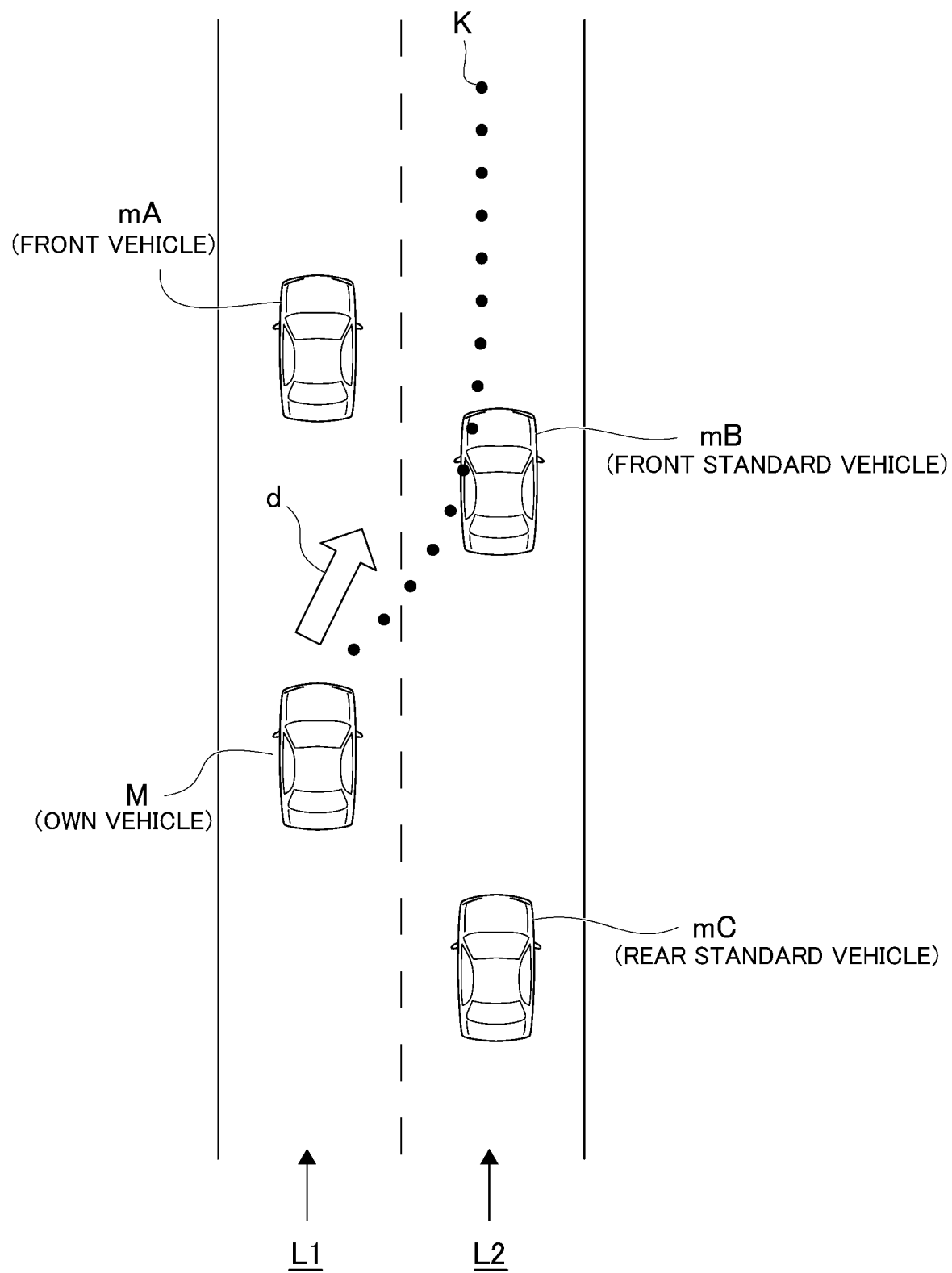
FIG. 5 is a diagram illustrating an example of a scenario in which a target trajectory is generated.

FIG. 5 is a diagram illustrating an example of a scenario in which a target trajectory is generated. For example, the action plan generator 140 assumes that the front vehicle mA, the front standard vehicle mB, and the rear standard vehicle mC are traveling in a predetermined speed model, as illustrated, generates a trajectory so that the own vehicle is located between the front standard vehicle mB and the rear standard vehicle mC at a certain future time without interference of the own vehicle M in the front vehicle mA based on the speed $V_M$ of the own vehicle M and the speed model of the three vehicles. For example, the action plan generator 140 smoothly connects a current position of the own vehicle M to a position of the front standard vehicle mB at a certain future time or the middle of the lane of the lane-changing destination and an ending spot of change in the lane by using a polynomial curve such as a spline curve and arranges a predetermined number of trajectory points K at equal intervals or unequal intervals on this curve. At this time, action plan generator 140 generates a trajectory so that at least one of the trajectory points K is disposed within the lane-changing target position TA. Thus, a target trajectory for changing the lane of the own vehicle M from the own lane to the adjacent lane is generated.

The action plan generator 140 may generate the target trajectory when various conditions such as the conditions that a demarcation line demarcating the lane of the lane-changing destination is not a road mark (for example, a yellow solid line) indicating prohibition of lane changing (prohibition of passing beyond), the lane of the lane-changing destination is recognized (the lane is actually located), a yaw rate detected by the vehicle sensor 40 is less than a threshold, and the speed $V_M$ of the own vehicle M assumed to be output at the time of changing of the lane is less than an upper limit speed (for example, about 135 [km/h]) are satisfied, in addition to the condition that no other vehicle is located as an obstacle in the lane-changing target position TA. The various conditions that no other vehicle is located as an obstacle in the lane-changing target position TA, a demarcation line demarcating the lane of the lane-changing destination is not a road mark indicating prohibition of lane changing (prohibition of passing beyond), the lane of the lane-changing destination is recognized, a yaw rate is less than a threshold, and the speed $V_M$ of the own vehicle M assumed to be output at the time of changing of the lane is less than an upper limit speed are examples of a "condition for the own vehicle to change its lane from the own lane to an adjacent lane."

The second controller 160 controls the travel driving power output device 200, the brake device 210, and the steering device 220 such that the own vehicle M passes along the target trajectory generated by the action plan generator 140 at scheduled times. The second controller 160 is an example of a "traveling controller."

The second controller 160 includes, for example, a second controller side acquirer 162, a speed controller 164, and a steering controller 166. The second controller side acquirer 162 acquires information regarding the target trajectory (trajectory points) generated by the action plan generator 140 and stores the information in a memory (not illustrated). The speed controller 164 controls the travel driving power output device 200 or the brake device 210 based on a target speed included as a speed element in the target trajectory stored in the memory. The steering controller 166 controls the steering device 220 in accordance with a curve state (curvature) of the target trajectory stored in the memory. Processes of the speed controller 164 and the steering controller 166 are realized through, for example, a combination of feed-forward control and a feedback control. For example, the steering controller 166 performs feed-forward control in accordance with a curvature of a road in front of the own vehicle M and feedback control based on a separation from the target trajectory in combination.

For example, when the target trajectory stored in the memory is a target trajectory generated in response to a lane-changing event or an event followed by a change in a lane, the speed controller 164 and the steering controller 166 controls the travel driving power output device 200, the brake device 210, and the steering device 220 such that automated lane changing is performed to cause the own vehicle M to change its lane. The second controller 160 may operate the turn indicator 80 when the automated lane changing is performed. The "operation" includes, for example, turning on the turn indicator 80 that has not been turned on, turning off the turn indicator 80 that has not been turned off, and blinking the turn indicator 80.

When a predetermined event is activated among a plurality of events planned by the action plan generator 140, the third controller 180 inhibits traveling control of the own vehicle M by the second controller based on a predetermined event in accordance with the speed $V_M$ of the own vehicle M. The predetermined event is an event followed by lane changing, such as the lane-changing event, the joining event, the branching event, or the overtaking event described above.

The third controller 180 includes, for example, a third controller side acquirer 182, a switching controller 184, an HMI controller 186, the occupant state determiner 188, and an inhibition controller 190.

The third controller side acquirer 182 acquires event activation information indicating that a predetermined event is activated from the action plan generator 140 when the action plan generator 140 activates a predetermined event and generates a target trajectory.

The switching controller 184 controls a control mode of the own vehicle M based on a detection result by the camera 10, the radar device 12, the finder 14, the object recognition device 16, the vehicle sensor 40, the operation amount detection sensor 90b, the touch detection sensor 90c, or the like and a determination result by the occupant state determiner 188 to be described below. The control mode of the own vehicle M includes, for example, a manual driving mode, a first automated driving mode, and a second automated driving mode. The first automated driving mode is an example of a "first mode" and the second automated driving mode is an example of a "second mode."

The manual driving mode is a mode in which the travel driving power output device 200, the brake device 210, and the steering device 220 are controlled in accordance with an operation amount of the driving operator 90 when the occupant operates the own vehicle M.

The first automated driving mode is a mode in which the second controller 160 controls the travel driving power output device 200, the brake device 210, and the steering device 220 when the occupant of the own vehicle M is grasping the steering wheel 90a (hereinafter referred to as a hands-on state). The first automated driving mode is performed, for example, in a section in which the degree of difficulty of automated driving is higher such as on a curved road, when there is a difference in elevation such as a ramp on a highway, in the vicinity of a tollgate, or at an intersection compared to a simple straight road. The first automated driving mode is an example of a "first mode."

The second automated driving mode is a mode in which a task requested of the occupant is fewer than in the first automated driving mode and is a mode in which the second controller 160 controls the travel driving power output device 200, the brake device 210, and the steering device 220 when the occupant of the own vehicle M is not grasping the steering wheel 90a (hereinafter referred to as a hands-off state). The second automated driving mode is performed, for example, in a section in which the degree of difficulty of automated driving is fewer than the first automated driving mode and the shape of a road is straight (for example, a main lane or the like of a highway). Accordingly, in the second automated driving mode, the degree of automated driving control is higher than in the first automated driving mode. In the second automated driving mode, the occupant may not be necessarily in the hands-off state and may be in the hands-on state. The second automated driving mode is an example of a "second mode."

For example, the switching controller 184 switches the control mode of the own vehicle M to the first automated driving mode when the event activation information acquired by the third controller side acquirer 182 indicates an event in a ramp of a highway.

For example, the switching controller 184 switches the control mode of the own vehicle M to the second automated driving mode when the event activation information acquired by the third controller side acquirer 182 indicates an event in a main lane of a highway.

For example, the switching controller 184 switches the control mode of the own vehicle M from either automated driving mode to the manual driving mode when the control mode of the own vehicle M is the first automated driving mode or the second automated driving mode and the occupant of the own vehicle M operates at least one of an accelerator pedal, a brake pedal, and the steering wheel 90a by a predetermined operation amount or more.

For example, the switching controller 184 switches the control mode of the own vehicle M to the first automated driving mode when the event activation information acquired by the third controller side acquirer 182 indicates a predetermined event and the speed $V_M$ of the own vehicle M is equal to or less than a predetermined speed $V_{Th}$ (for example, about 50 [km/h] or 60 [km/h]). That is, the switching controller 184 switches the control mode of the own vehicle M to a mode in which the occupant is requested to operate in a hands-on state to perform the lane changing through the automated driving when the lane changing is performed and the speed $V_M$ of the own vehicle M is equal to or less than the predetermined speed $V_{Th}$.

For example, when the switching controller 184 switches the control mode of the own vehicle M, the HMI controller 186 outputs information regarding the switching of the mode to each display device or speaker or the like of the HMI 30.

For example, based on a detection result of the operation amount detection sensor 90b provided in the steering wheel 90a or a detection result of the touch detection sensor 90c, the occupant state determiner 188 determines whether the occupant of the own vehicle M is in the hands-on state or the hands-off state. For example, when a steering torque detected by the operation amount detection sensor 90b provided in the steering wheel 90a is equal to or greater than a threshold, the occupant state determiner 188 may determine that the occupant of the own vehicle M is in the hands-on state. This threshold is set to, for example, a value lower than the steering torque given to a shaft when the occupant is grasping the steering wheel 90a. When a predetermined detection signal indicating that electrostatic capacitance is equal to or greater than a threshold is input from the touch detection sensor 90c, the occupant state determiner 188 may determine that the occupant of the own vehicle M is in the hands-on state. The occupant state determiner 188 may analyzes an image captured by the interior camera 70 and determine whether the occupant of the own vehicle M is in the hands-on state.

When the event activation information acquired by the third controller side acquirer 182 indicates a predetermined event and the speed $V_M$ of the own vehicle M detected by the vehicle sensor 40 is equal to or less than the predetermined speed $V_{Th}$, the inhibition controller 190 instructs the second controller 160 to inhibit control based on the target trajectory generated in response to the predetermined event. That is, when the lane-changing event or an event followed by the lane changing is performed and the speed $V_M$ of the own vehicle M is equal to or less than the predetermined speed $V_{Th}$, the inhibition controller 190 inhibits the automated lane changing by the second controller 160. The inhibition controller 190 may instruct the action plan generator 140 to stop generating the target trajectory in response to the predetermined event instead of instructing the second controller 160 to inhibit the automated lane changing. The inhibition controller 190 may cause the action plan generator 140 to stop generating the target trajectory by inhibiting (for example, stopping) a process of determining the foregoing various conditions. Thus, the inhibition controller 190 inhibits the automated lane changing by the second controller 160.

[Process Flow]

Figure 6:
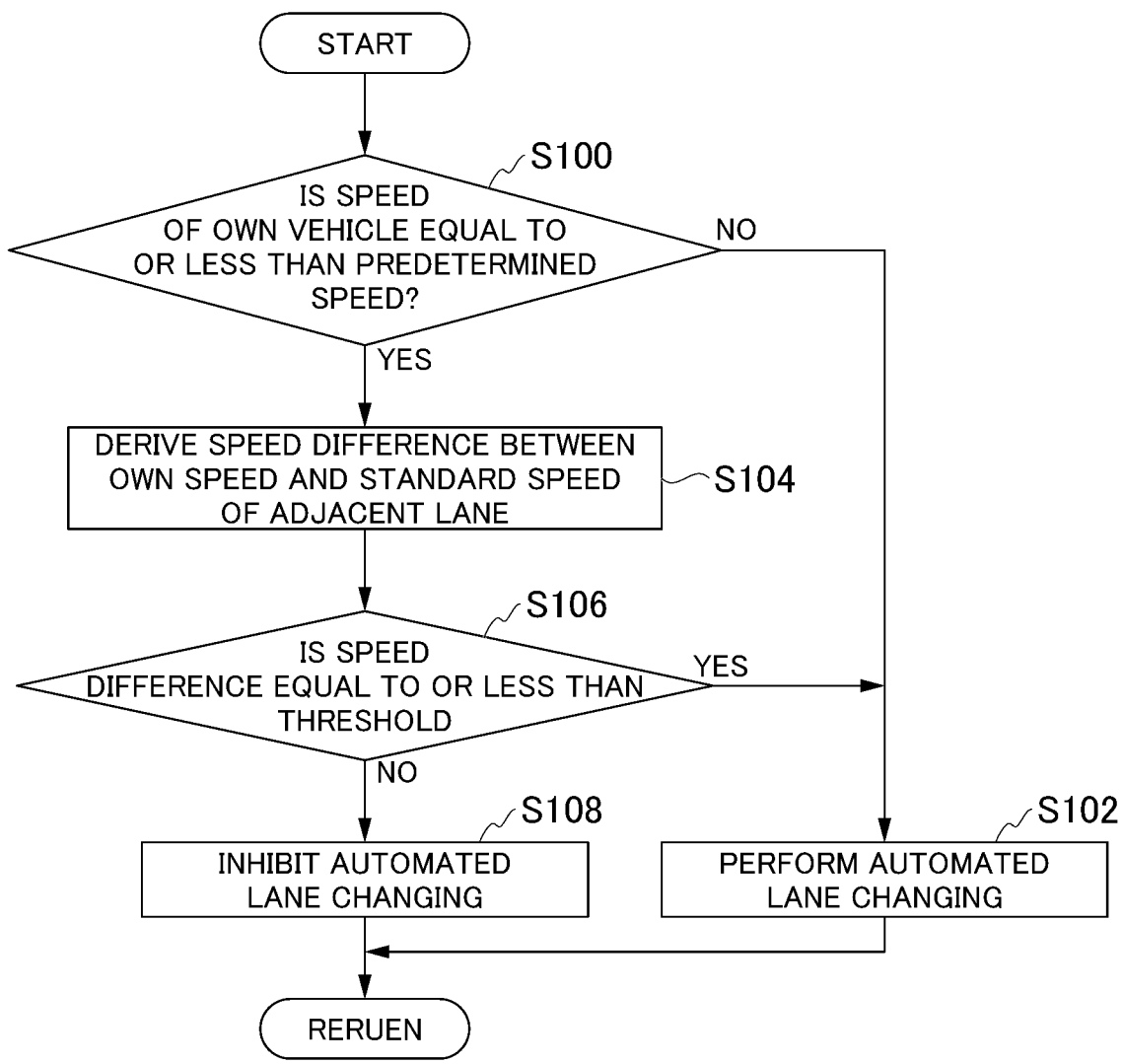
FIG. 6 is a flowchart illustrating an example of a flow of a series of processes by a third controller 180 according to the first embodiment.

Hereinafter, a flow of a series of processes by the third controller 180 will be described with reference to the flowchart. FIG. 6 is a flowchart illustrating an example of a flow of a series of processes by the third controller 180 according to the first embodiment. The processes of the flowchart are performed when the event activation information acquired by the third controller side acquirer 182 is information indicating a predetermined event. That is, the processes of the flowchart are performed when the own vehicle M arrives at a section in which a predetermined event is planned or the lane-changing start switch 30a or the turn indicator lever 90d is operated. The processes of the flowchart may be started when various switches or levers included in the HMI 30 are operated by the occupant of the own vehicle M. In the following description, it is assumed that when the lane-changing target position TA is set, another vehicle which is at least the rear standard vehicle mC between the front standard vehicle mB and the rear standard vehicle mC is not recognized by the recognizer 130 for description. That is, no other vehicle is assumed to be located on the side behind the own vehicle M within detection ranges of various sensors such as the radar device 12 and the finder 14. The term "the rear side" is, for example, a region which is farther behind the vehicle than the position of a door mirror of the own vehicle M in an adjacent lane which is adjacent to the own lane. Compared to the rear side, a side in front is a region which is farther in front of the vehicle than the position of the door mirror of the own vehicle M in the adjacent lane which is adjacent to the own lane.

Apart from the processes of the flowchart, the action plan generator 140 determines whether a lane can be changed to an adjacent lane in accordance with whether the various conditions that no other vehicle is located as an obstacle in the lane-changing target position TA, a demarcation line demarcating the lane of the lane-changing destination is not a road mark indicating prohibition of lane changing (prohibition of passing beyond), the lane of the lane-changing destination is recognized, a yaw rate is less than a threshold, and the speed $V_M$ of the own vehicle M assumed to be output at the time of changing of the lane is less than an upper limit speed are satisfied.

First, based on information input from the vehicle sensor 40, the inhibition controller 190 determines whether the speed $V_M$ of the own vehicle M is equal to or less than the predetermined speed $V_{Th}$ (step S100). For example, when the front vehicle mA is in front of the own vehicle M and the front vehicle mA is slower than the own vehicle M, the action plan generator 140 plans an overtalking event. In this case, until it is determined that the lane changing to the adjacent lane is possible (until the foregoing determination condition is satisfied), the action plan generator 140 generates a target trajectory to cause the own vehicle M to gradually decelerate so that an inter-vehicle distance from the front vehicle mA is constant and outputs the target trajectory to the second controller 160. Thus, the own vehicle M waits for the lane changing in the own lane while decelerating. At this time, the speed $V_M$ of the own vehicle M will inevitably become equal to or less than the predetermined speed $V_{Th}$ in some cases depending on an increase or decrease in the deceleration. When a speed limit of the own lane is set to the predetermined speed $V_{Th}$ or less or a speed limit is set to be the predetermined speed $V_{Th}$ or less by the occupant of the own vehicle M, the speed $V_M$ of the own vehicle M becomes the predetermined speed $V_{Th}$ or less.

When the speed $V_M$ of the own vehicle M is determined to be greater than the predetermined speed $V_{Th}$, the inhibition controller 190 causes the second controller 160 to perform the automated lane changing based on the target trajectory generated in response to the predetermined event by the action plan generator 140 without inhibiting the automated lane changing by the second controller 160 (step S102). For example, even when another vehicle is located outside of a detection range of a sensor on the rear side of the own vehicle M and a speed of the unrecognized other vehicle is a fast speed of about 80 [km/h] to 100 [km/h], the speed $V_M$ of the own vehicle M is greater than the predetermined speed $V_{Th}$. Therefore, a speed of the own vehicle M relative to the unrecognized other vehicle decreases. As a result, even when the other vehicle located outside of the detection range of the sensor enters the detection range of the sensor after start of the lane changing, a sufficient inter-vehicle distance from the other vehicle in the adjacent lane which is the lane-changing destination can be maintained. Therefore, it is possible to inhibit interruption of the own vehicle M during the lane changing or the lane changing or abrupt acceleration thereof in the middle of the lane changing.

Conversely, when the speed $V_M$ of the own vehicle M is determined to be equal to or less than the predetermined speed $V_{Th}$, the inhibition controller 190 derives a speed difference between the speed $V_M$ of the own vehicle M and a standard speed in the adjacent lane which is the lane-changing destination (step S104). For example, when the recognizer 130 recognizes a speed limit sign of the adjacent lane, the inhibition controller 190 specifies the speed limit of the adjacent lane from a number shown on the speed limit sign and derives the specified speed limit as a standard speed of the adjacent lane. The inhibition controller 190 may derive an average speed or the like of one or more other vehicles recognized in the adjacent lane by the recognizer 130 as the standard speed of the adjacent lane. Then, the inhibition controller 190 compares the derived standard speed of the adjacent lane with the speed $V_M$ of the own vehicle M and derives the speed difference.

Subsequently, the inhibition controller 190 determines whether the speed difference is equal to or less than a threshold (step S106). When the inhibition controller 190 determines that the speed difference is equal to or less than the threshold, the inhibition controller 190 causes the process to proceed to S102 and the automated lane changing by the second controller 160 is not inhibited. The second controller 160 is caused to perform the automated lane changing based on the target trajectory generated in response to the predetermined event by the action plan generator 140.

Conversely, when the inhibition controller 190 determines that the speed difference is greater than the threshold, the inhibition controller 190 inhibits the automated lane changing by the second controller 160 (step S108). For example, the inhibition controller 190 may inhibit the automated lane changing by stopping a part of the control of the second controller 160 followed by the automated lane changing or may inhibit the automated lane changing by stopping all of the control. For example, the inhibition controller 190 inhibits steering control of lane keeping by causing the second controller 160 to stop the steering control of the own vehicle M toward the adjacent lane or inhibits the automated lane changing by causing the second controller 160 to continue the speed control of constant speed traveling or the like. Then, the processes of the flowchart end.

Figure 7:
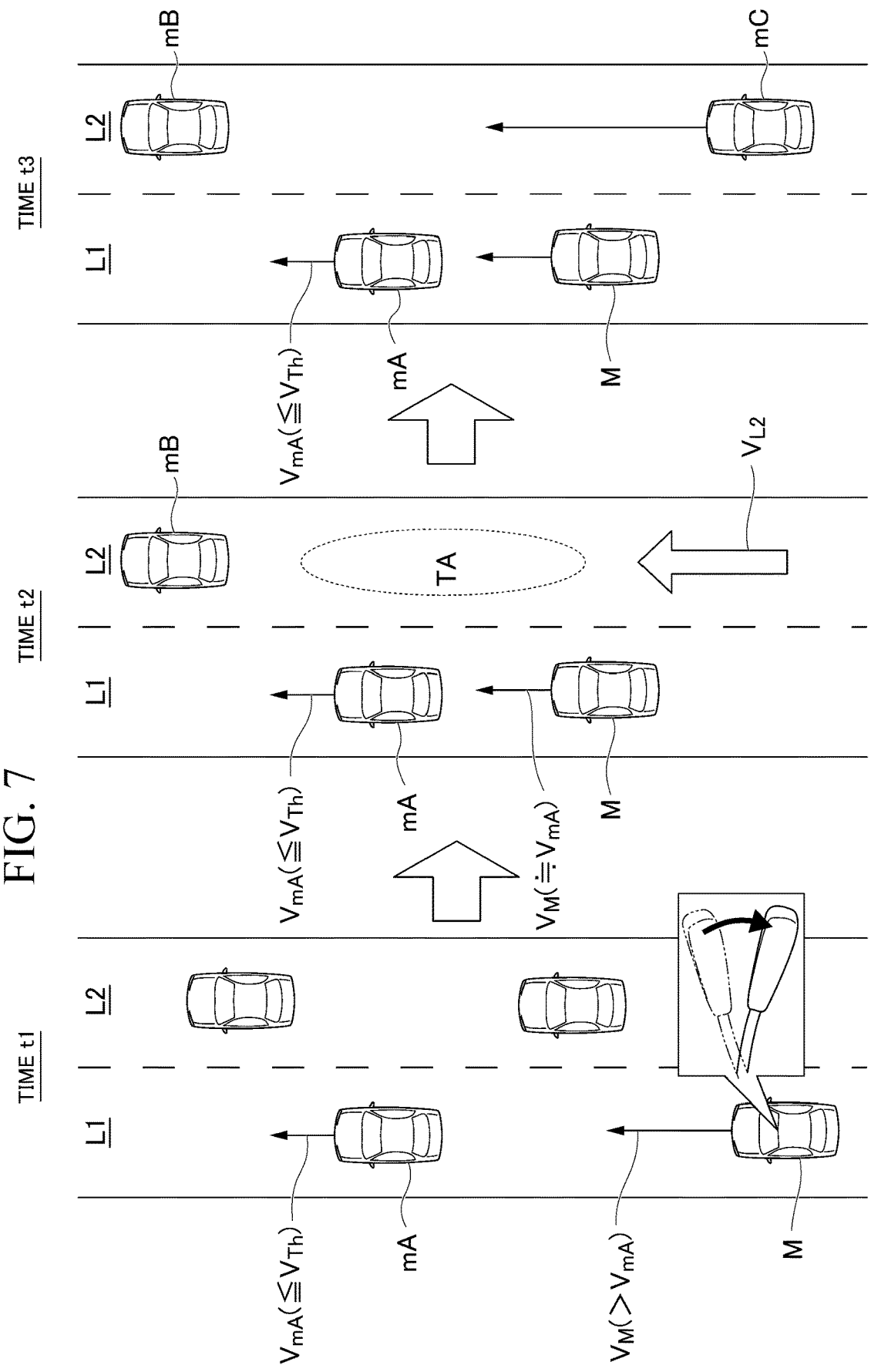
FIG. 7 is a diagram illustrating an example of a scenario in which automated lane changing is inhibited.

FIG. 7 is a diagram illustrating an example of a scenario in which automated lane changing is inhibited. For example, a scenario of time t1 shows that a speed $V_{mA}$ of the front vehicle mA is equal to or less than the predetermined speed $V_{Th}$ and the speed $V_M$ of the own vehicle M is greater than a speed $V_{mA}$ of the front vehicle mA. In this case, to cause the own vehicle M to overtake the front vehicle mA, as illustrated, it is assumed that the occupant of the own vehicle M tilts the turn indicator lever 90d to the right to instruct the automated driving controller 100 to change its lane. When the turn indicator lever 90d is operated, the action plan generator 140 plans a lane-changing event to change the lane of the own vehicle M from the own lane L1 to the right adjacent lane L2. As described above, in addition to the operation on the turn indicator lever 90d, when the own vehicle M arrives in front of a branching spot or a joining spot or overtakes the front vehicle mA, the action plan generator 140 may plan another event followed by the lane-changing event or the lane changing.

Then, the action plan generator 140 sets the lane-changing target position TA on the adjacent lane L2 and determines whether the above-described various conditions are satisfied. In a scenario of time t2, since the recognizer 130 does not recognize the rear standard vehicle mC between the front standard vehicle mB and the rear standard vehicle mC, the lane-changing target position TA is set on the rear side of the front standard vehicle mB.

For example, the action plan generator 140 sets the lane-changing target position TA on the adjacent lane L2. However, when another vehicle is located as an obstacle at the lane-changing target position TA or a demarcation line demarcating the lane of the lane-changing destination and the own lane is a section line in which lane changing is prohibited, a condition that the lane changing is determined to be possible is not satisfied, and thus the target trajectory for keeping the own lane L1 is continuously generated. At this time, since a constant relative distance between the own vehicle M and the front vehicle mA is maintained, the action plan generator 140 causes the own vehicle M to decelerate by decreasing the target speed included as the speed element in the target trajectory. As a result, as in the scenario of time t2, the speed $V_M$ of the own vehicle M is the same as the speed $V_{mA}$ of the front vehicle within a range of an error of about several [%] to several tens of [%], and the speed $V_M$ of the own vehicle M is equal to or less than the predetermined speed $V_{Th}$ in some cases. In these cases, the inhibition controller 190 obtains the speed difference between the speed $V_M$ of the own vehicle M and the standard speed $V_{L2}$ of the adjacent lane L2. When the speed difference is greater than a threshold, the inhibition controller 190 inhibits the automated lane changing by the second controller 160 despite the fact that the lane changing by the action plan generator 140 is determined to be possible from time t2 to time t3, as illustrated in the scenario of time t3. In response to this, the action plan generator 140 generates a target trajectory so that the own vehicle M keeps the own lane L1 and outputs the target trajectory to the second controller 160. Through such control, when the speed of the own vehicle M is slower than the predetermined speed $V_{Th}$, the own vehicle M can wait in the own lane L1 without changing its lane in consideration that another vehicle which is a candidate for the rear standard vehicle mC enters at a speed (for example, a speed of which a speed difference is equal to or greater than the threshold) greater than the speed $V_M$ of the own vehicle M from outside of the detection range of the sensor.

[Process Flow of Other (1)]

Figure 8:
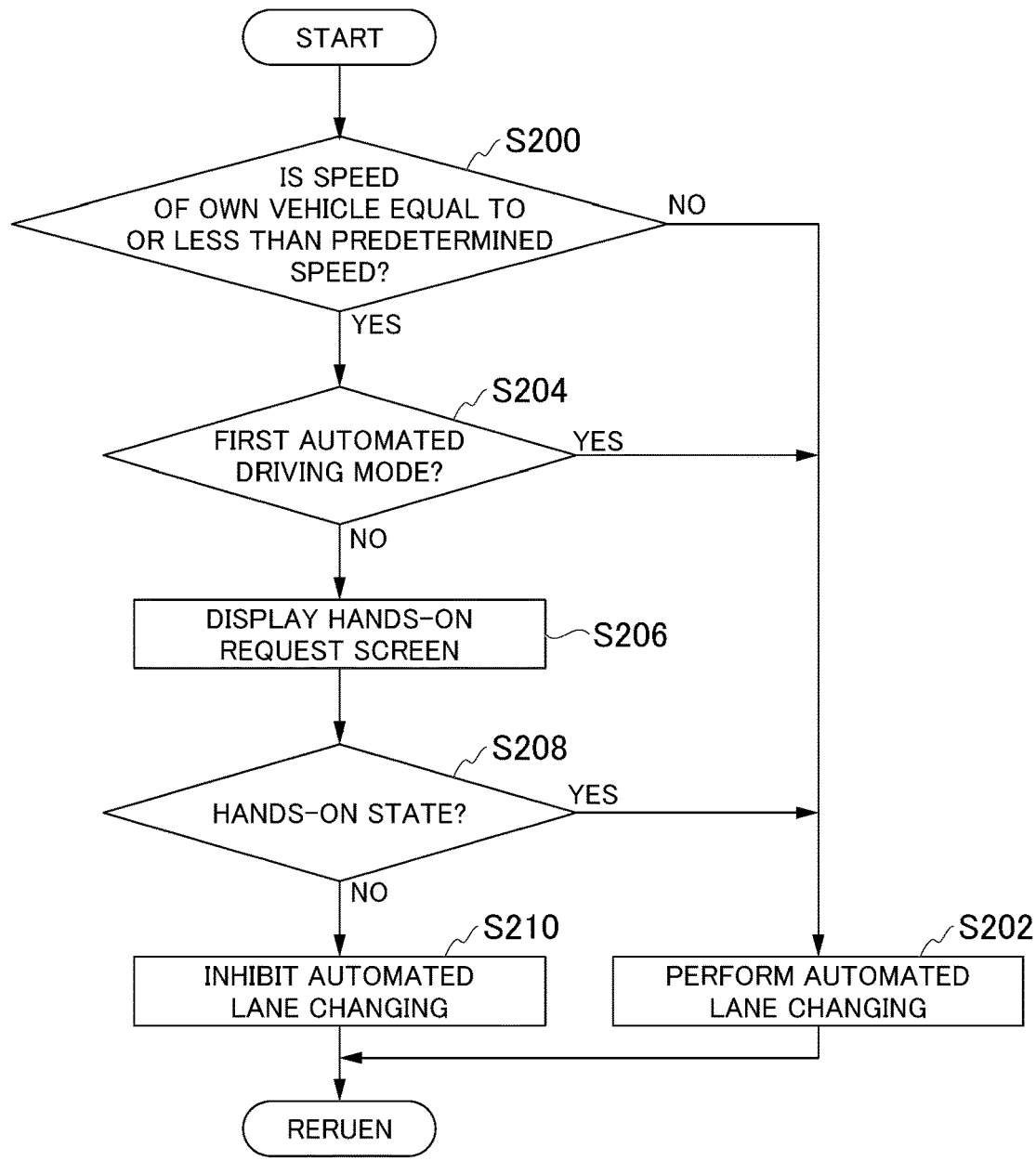
FIG. 8 is a flowchart illustrating another example of the flow of the series of processes by the third controller 180 according to the first embodiment.

The third controller 180 may determine whether the automated lane changing is inhibited in accordance with a flowchart illustrated in FIG. 8. FIG. 8 is a flowchart illustrating another example of the flow of the series of processes by the third controller 180 according to the first embodiment. The processes of the flowchart are also performed when the event activation information acquired by the third controller side acquirer 182 is information indicating a predetermined event as in the processes of the flowchart exemplified in FIG. 6. Apart from the processes of the flowchart, the action plan generator 140 is assumed to determine whether the change in the lane to the adjacent lane is possible.

First, based on information input from the vehicle sensor 40, the inhibition controller 190 determines whether the speed $V_M$ of the own vehicle M is equal to or less than the predetermined speed $V_{Th}$ (step S200).

When the inhibition controller 190 determines that the speed $V_M$ of the own vehicle M is greater than the predetermined speed $V_{Th}$, the inhibition controller 190 causes the second controller 160 to perform the automated lane changing based on the target trajectory generated in response to the predetermined event by the action plan generator 140 without inhibiting the automated lane changing by the second controller 160 (step S202).

Conversely, when the inhibition controller 190 determines that the speed $V_M$ of the own vehicle M is equal to or less than the predetermined speed $V_{Th}$, the inhibition controller 190 determines whether the control mode of the own vehicle M is the first automated driving mode (the automated driving mode in which hands-on is necessary) (step S204).

When the inhibition controller 190 determines that the control mode of the own vehicle M is the first automated driving mode, that is, the occupant of the own vehicle M is in the hands-on state, the inhibition controller 190 causes the process to proceed to step S202 and causes the second controller 160 to perform the automated lane changing based on the target trajectory generated in response to the predetermined event by the action plan generator 140 without inhibiting the automated lane changing by the second controller 160 since the automated lane changing is possible despite the speed $V_M$ of the own vehicle M equal to or less than the predetermined speed $V_{Th}$.

Conversely, when the inhibition controller 190 determines that the control mode of the own vehicle M is the second automated driving mode (the automated driving mode in which a hands-on state is not necessary) rather than the first automated driving mode, that is, the occupant of the own vehicle M is in the hands-off state, the HMI controller 186 causes each display device of the HMI 30 to display a screen for requesting the occupant of the own vehicle M to operate in the hands-on state in order to perform the automated lane changing under the condition that the speed $V_M$ of the own vehicle M is equal to or less than the predetermined speed $V_{Th}$. (step S206). At this time, the HMI controller 186 may output sound for requesting the occupant to operate in the hands-on state from the speaker of the HMI 30.

Figure 9:
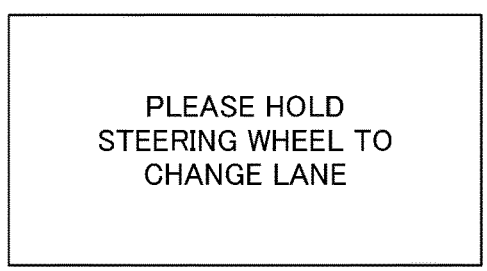
FIG. 9 is a diagram illustrating an example of a screen on which a hands-on request is made.

FIG. 9 is a diagram illustrating an example of a screen on which a hands-on request is made. As in the illustrated example, the HMI controller 186 may display an image or text "Please hold the steering wheel 90a" on the screen.

Subsequently, the occupant state determiner 188 determines whether the occupant of the own vehicle M is in the hands-on state based on a detection result of the operation amount detection sensor 90b provided in the steering wheel 90a, a detection result of the touch detection sensor 90c, or an analysis result of an image captured by the interior camera 70 (step S208).

When the occupant state determiner 188 determines that the occupant of the own vehicle M is in the hands-on state, the switching controller 184 switches the control mode of the own vehicle M from the second automated driving mode to the first automated driving mode. Thus, when the speed $V_M$ of the own vehicle M is equal to or less than the predetermined speed $V_{Th}$, the condition for performing the automated lane changing is established. Therefore, the inhibition controller 190 causes the process to proceed to S202 and causes the second controller 160 to perform the automated lane changing based on the target trajectory generated in response to the predetermined event by the action plan generator 140 without inhibiting the automated lane changing by the second controller 160.

Conversely, when the occupant state determiner 188 determines the occupant of the own vehicle M is in the hands-off state rather than the hands-on state, the inhibition controller 190 inhibits the automated lane changing by the second controller 160 since the control mode of the own vehicle M cannot be switched from the second automated driving mode to the first automated driving mode under the condition in which the speed $V_M$ of the own vehicle M is equal to or less than the predetermined speed $V_{Th}$ (step S210). Then, the processes of the flowchart end. In this way, when the speed $V_M$ of the own vehicle M is equal to or less than the predetermined speed $V_{Th}$, the automated driving controller 100 inhibits the automated lane changing in principle. However, when the occupant of the own vehicle M is in the hands-on state, the automated lane changing is performed without inhibiting the automated lane changing since instantaneous steering control can be performed through an operation on the steering wheel 90a of the occupant.

Figure 10:
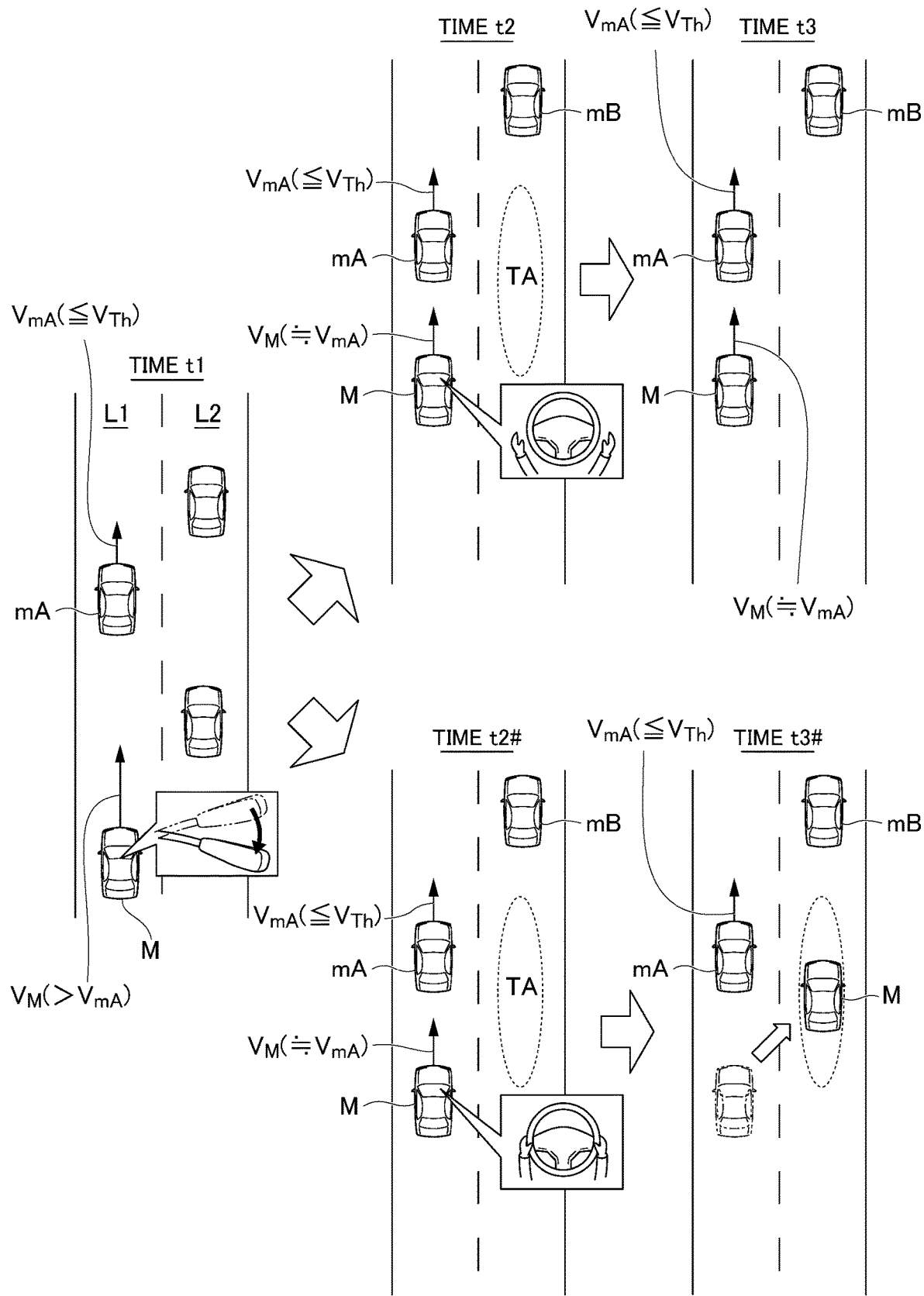
FIG. 10 is a diagram illustrating a scenario in which the automated lane changing is not inhibited is compared with a scenario in which the automated lane changing is inhibited.

FIG. 10 is a diagram illustrating a scenario in which the automated lane changing is not inhibited is compared with a scenario in which the automated lane changing is inhibited. For example, in a scenario of time t1, it is assumed that the turn indicator lever 90d is operated and the action plan generator 140 plans the lane-changing event for changing the lane of the own vehicle M from the own lane L1 to the right adjacent lane L2. In this case, the inhibition controller 190 determines whether the speed $V_M$ of the own vehicle M is equal to or less than the predetermined speed $V_{Th}$. For example, in a scenario of time t2 after time t1, since the speed $V_M$ of the own vehicle M is equal to or less than the predetermined speed $V_{Th}$, the occupant of the own vehicle M is requested to perform the hands-on. In the scenario of time t2, however, the occupant detaches his or her hands from the steering wheel 90a and enters the hands-off state.

In this case, the inhibition controller 190 inhibits the automated lane changing by the second controller 160 and causes the own vehicle M to wait in the own lane L1 without changing the lane as in the scenario of time t3.

Conversely, in a scenario of time t2 # after time t1, the speed $V_M$ of the own vehicle M is equal to or less the predetermined speed $V_{Th}$ as in the scenario of time t2. Therefore, the occupant of the own vehicle M is requested to perform the hands-on. In the scenario of time t2 #, the occupant holds the steering wheel 90a with his or her hands and therefore enters the hands-on state. Accordingly, the inhibition controller 190 causes the own vehicle M to perform the automated lane changing by the second controller 160 without inhibiting the automated lane changing as in a scenario of time t3 #.

[Process Flow of Other (2)]

Figure 11:
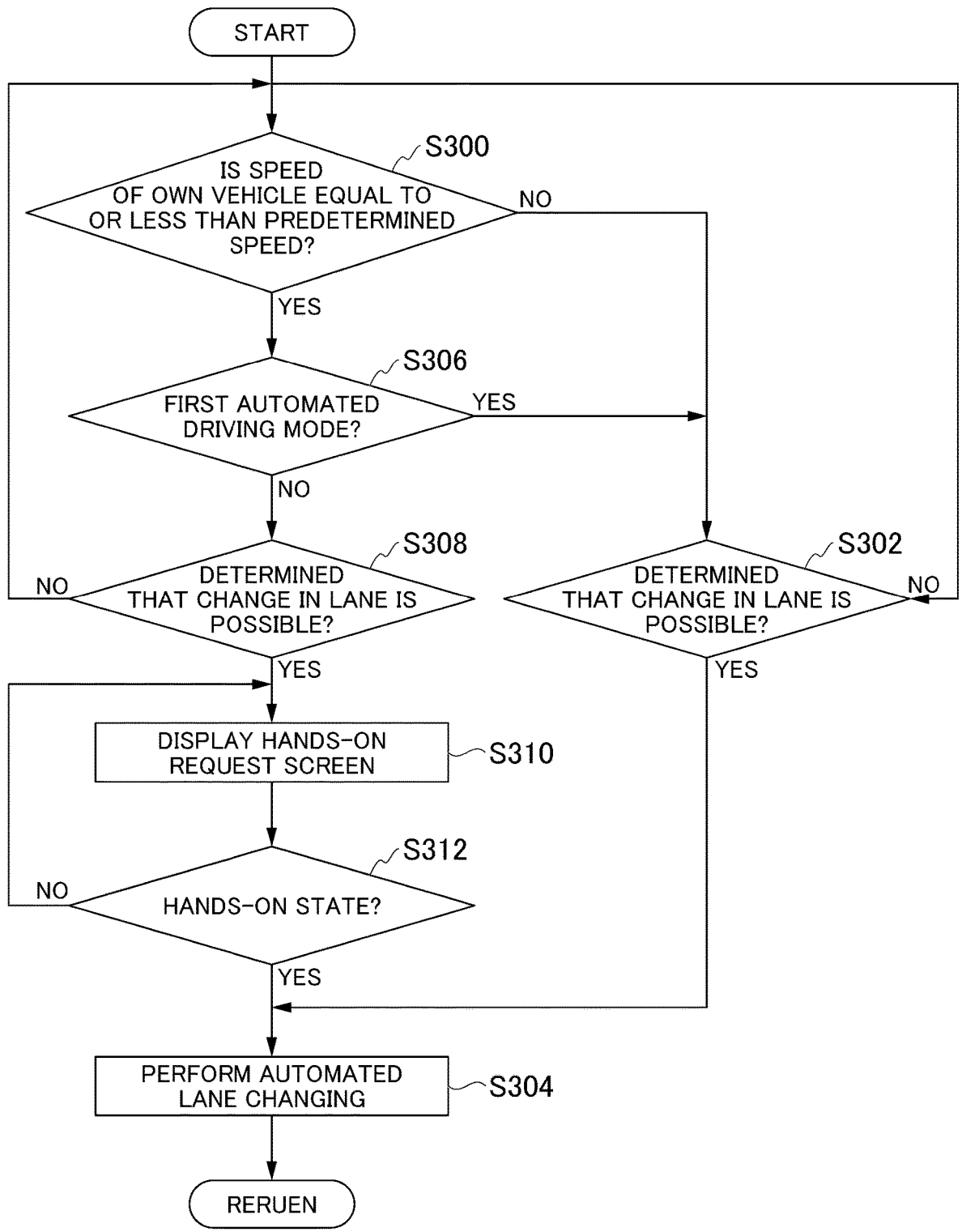
FIG. 11 is a flowchart illustrating still another example of the flow of the series of processes by the third controller 180 according to the first embodiment.

The third controller 180 may determine whether the automated lane changing is inhibited in accordance with a flowchart illustrated in FIG. 11. FIG. 11 is a flowchart illustrating still another example of the flow of the series of processes by the third controller 180 according to the first embodiment. The processes of the flowchart are also performed when the event activation information acquired by the third controller side acquirer 182 is information indicating a predetermined event as in the processes of the flowchart exemplified in FIG. 6 or 8. Apart from the processes of the flowchart, the action plan generator 140 is assumed to determine whether the change in the lane to the adjacent lane is possible.

First, based on information input from the vehicle sensor 40, the inhibition controller 190 determines whether the speed $V_M$ of the own vehicle M is equal to or less than the predetermined speed $V_{Th}$ (step S300).

When the inhibition controller 190 determines that the speed $V_M$ of the own vehicle M is greater than the predetermined speed $V_{Th}$, the action plan generator 140 determines whether the change in the lane to the adjacent lane is already possible (step S302). When the action plan generator 140 determines that the change in the lane to the adjacent lane is not yet possible, the process returns to S300.

Conversely, the action plan generator 140 determines that the change in the lane to the adjacent lane is already possible, the inhibition controller 190 causes the second controller 160 to perform the automated lane changing based on the target trajectory generated in response to the predetermined event by the action plan generator 140 without inhibiting the automated lane changing by the second controller 160 (step S304).

Conversely, when the inhibition controller 190 determines that the speed $V_M$ of the own vehicle M is equal to or less than the predetermined speed $V_{Th}$, the inhibition controller 190 determines whether the control mode of the own vehicle M is the first automated driving mode (the automated driving mode in which the hands-on is necessary) (step S306). When the inhibition controller 190 determines that the control mode of the own vehicle M is the first automated driving mode, the occupant of the own vehicle M is in the hands-on state under the condition that the speed $V_M$ of the own vehicle M is equal to or less the predetermined speed $V_{Th}$. Therefore, the process proceeds to S302.

Conversely, when the inhibition controller 190 determines that the control mode of the own vehicle M is the second automated driving mode (the automated driving mode in which hands-on is not necessary) rather than the first automated lane driving mode, the action plan generator 140 determines whether the change in the lane to the adjacent lane is already possible (step S308) as in the process of S302. When the action plan generator 140 determines that the change in the lane to the adjacent lane is not yet possible, the process returns to S300.

Conversely, when the action plan generator 140 determines that the change in the lane to the adjacent lane is already possible, the occupant of the own vehicle M enters the hands-on state and the HMI controller 186 causes each display device of the HMI 30 to display a screen for requesting the occupant of the own vehicle M to perform the hands-on or causes the speaker to output a sound for requesting the hands-on in order to switch the control mode of the own vehicle M from the second automated driving mode to the first automated driving mode (step S310).

Subsequently, the occupant state determiner 188 determines whether the occupant of the own vehicle M is in the hands-on state based on a detection result of the operation amount detection sensor 90b provided in the steering wheel 90a, a detection result of the touch detection sensor 90c, or an analysis result of an image captured by the interior camera 70 (step S312).

Until the occupant state determiner 188 determines that the occupant of the own vehicle M is in the hands-on state, the HMI controller 186 continues to request the occupant to perform the hands-on by causing the HMI 30 to display a screen for requesting the hands-on or the speaker to output a sound for requesting the hands-on. When the occupant does not enter the hands-on state within a predetermined time after the hands-on request, the inhibition controller 190 may inhibit the automated lane changing by the second controller 160.

When the occupant state determiner 188 determines that the occupant of the own vehicle M is in the hands-on state, the switching controller 184 switches the control mode of the own vehicle M from the second automated driving mode to the first automated driving mode. Thus, when the speed $V_M$ of the own vehicle M is equal to or less than the predetermined speed $V_{Th}$, the condition for performing the automated lane changing is established. Therefore, the inhibition controller 190 causes the process to proceed to S304 and causes the second controller 160 to perform the automated lane changing based on the target trajectory generated in response to the predetermined event by the action plan generator 140 without inhibiting the automated lane changing by the second controller 160. Then, the processes of the flowchart end. In this way, when the speed $V_M$ of the own vehicle M is equal to or less than the predetermined speed $V_{Th}$ and the action plan generator 140 determines that the lane changing is already possible, the determination result is continuously maintained until the occupant of the own vehicle M enters the hands-on state, the automated lane changing is inhibited, and the automated lane changing is performed at a timing at which the occupant enters the hands-on state. Therefore, it is possible to perform the lane changing more smoothly in a scenario in which the lane changing is necessary in consideration of presence of other vehicles outside of the detection range of the sensor.

Figure 12:
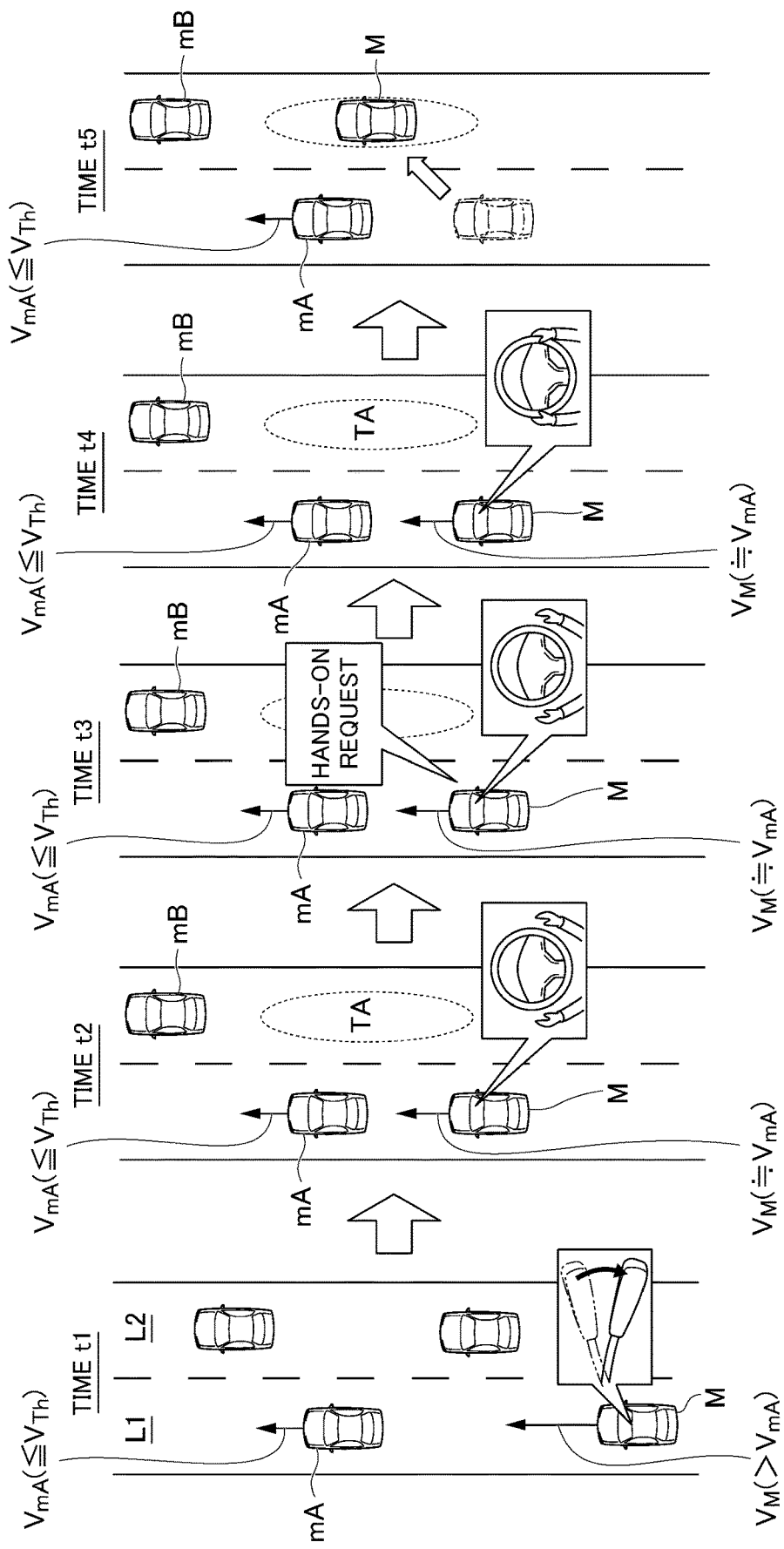
FIG. 12 is a diagram illustrating an example of a scenario in which the automated lane changing is inhibited until a hands-on state when it is determined that a change in the lane to an adjacent lane is possible.

FIG. 12 is a diagram illustrating an example of a scenario in which the automated lane changing is inhibited until a hands-on state when it is determined that a change in the lane to an adjacent lane is possible. For example, in a scenario of time t1, it is assumed that the turn indicator lever 90d is operated and the action plan generator 140 plans the lane-changing event for changing the lane of the own vehicle M from the own lane L1 to the right adjacent lane L2. In this case, the inhibition controller 190 determines whether the speed $V_M$ of the own vehicle M is equal to or less than the predetermined speed $V_{Th}$. For example, in a scenario of time t2 after time t1, since the speed $V_M$ of the own vehicle M is equal to or less than the predetermined speed $V_{Th}$, the hands-on by the occupant of the own vehicle M is necessary. In the scenario of time t2, however, since the occupant detaches his or her hands from the steering wheel 90a and is in the hands-off state. Therefore, in a scenario of time t3 after time t2, the HMI controller 186 requests the occupant to perform the hands-on by causing the HMI 30 to display a screen for requesting the hands-on or causing the speaker to output a sound for requesting the hands-on. Meanwhile, even when the action plan generator 140 determines that the lane changing is already possible, the inhibition controller 190 continues to inhibit the automated lane changing by the second controller 160. Subsequently, when the occupant holds the steering wheel 90a with his or her hands in a scenario of time t4 and enters the hands-on state, the inhibition of the automated lane changing is cancelled and the second controller 160 is caused to perform the automated lane changing in time t5 after time t4.

According to the above-described first embodiment, the vehicle control system includes the recognizer 130 that recognizes a surrounding situation of the own vehicle M; the action plan generator 140 that determines whether a condition for the own vehicle M to be able to change the own lane to an adjacent lane is satisfied based on the surrounding situation recognized by the recognizer 130 and generates a target trajectory for changing the lane of the own vehicle M when the action plan generator 140 determines that the condition for changing the lane is satisfied; the second controller 160 that controls the automated lane changing based on the target trajectory generated by the action plan generator 140; and the inhibition controller 190 that causes the second controller 160 to inhibit control of the automated lane changing or causes the action plan generator 140 to inhibit a process of determining whether to change the lane when the speed $V_M$ of the own vehicle M is equal to or less than the predetermined speed $V_{Th}$. Thus, it is possible to perform the lane changing in accordance with the surrounding situation of the lane-changing destination.

For example, when it is assumed that an unrecognized other vehicle is located outside of the detection range of the rear sensor of the own vehicle M and the speed $V_M$ of the own vehicle M is equal to or less than the predetermined speed $V_{Th}$, there is a high probability of the speed of the unrecognized other vehicle being relatively greater than the speed of the own vehicle M. In this case, the speed of the own vehicle M relative to the unrecognized other vehicle easily increases. Therefore, when the own vehicle M starts changing its lane and then the other vehicle located outside of the detection range of the sensor enters the detection range of the sensor, a sufficient inter-vehicle distance from the other vehicle in the adjacent lane of the lane-changing destination cannot be maintained in some cases. In the embodiment, however, when the speed $V_M$ of the own vehicle M is equal to or less than the predetermined speed $V_{Th}$, the lane changing can be performed in consideration of presence of the other vehicle of the lane-changing destination which is not unrecognized at the time of starting of the lane changing to inhibit the lane changing.

According to the above-described first embodiment, when the speed $V_M$ of the own vehicle M is equal to or less than the predetermined speed $V_{Th}$ and the occupant is in the hands-on state, the automated lane changing is not inhibited. Therefore, it is possible to perform the automated lane changing more smoothly.

Second Embodiment

Hereinafter, a second embodiment will be described. In the above-described first embodiment, when the speed $V_M$ of the own vehicle M is equal to or less than the predetermined speed $V_{Th}$, an event activated by the action plan generator 140 is an event followed by the lane changing such as a lane-changing event, a joining event, a branching event, or an overtaking event, that is, the event is a predetermined event, the inhibition controller 190 inhibits the automated lane changing based on the target trajectory generated in response to the event, as described above. However, the second embodiment is different from the above-described first embodiment in that it is determined whether to inhibit the automated lane changing in accordance with whether an event is necessary despite the predetermined event. Hereinafter, differences from the first embodiment will be mainly described and description of functions or the like common to the first embodiment will be omitted.

In the second embodiment, the inhibition controller 190 inhibits the automated lane changing, for example, when the speed $V_M$ of the own vehicle M is equal to or less than the predetermined speed $V_{Th}$, event activation information acquired by the third controller side acquirer 182 indicates a predetermined event which is not necessary to perform until arrival at a destination, such as an overtaking event. The inhibition controller 190 does not inhibit the automated lane changing when the event activation information indicates a predetermined event which is essential before arrival at the destination, such as a joining event or a branching event.

Figure 13:
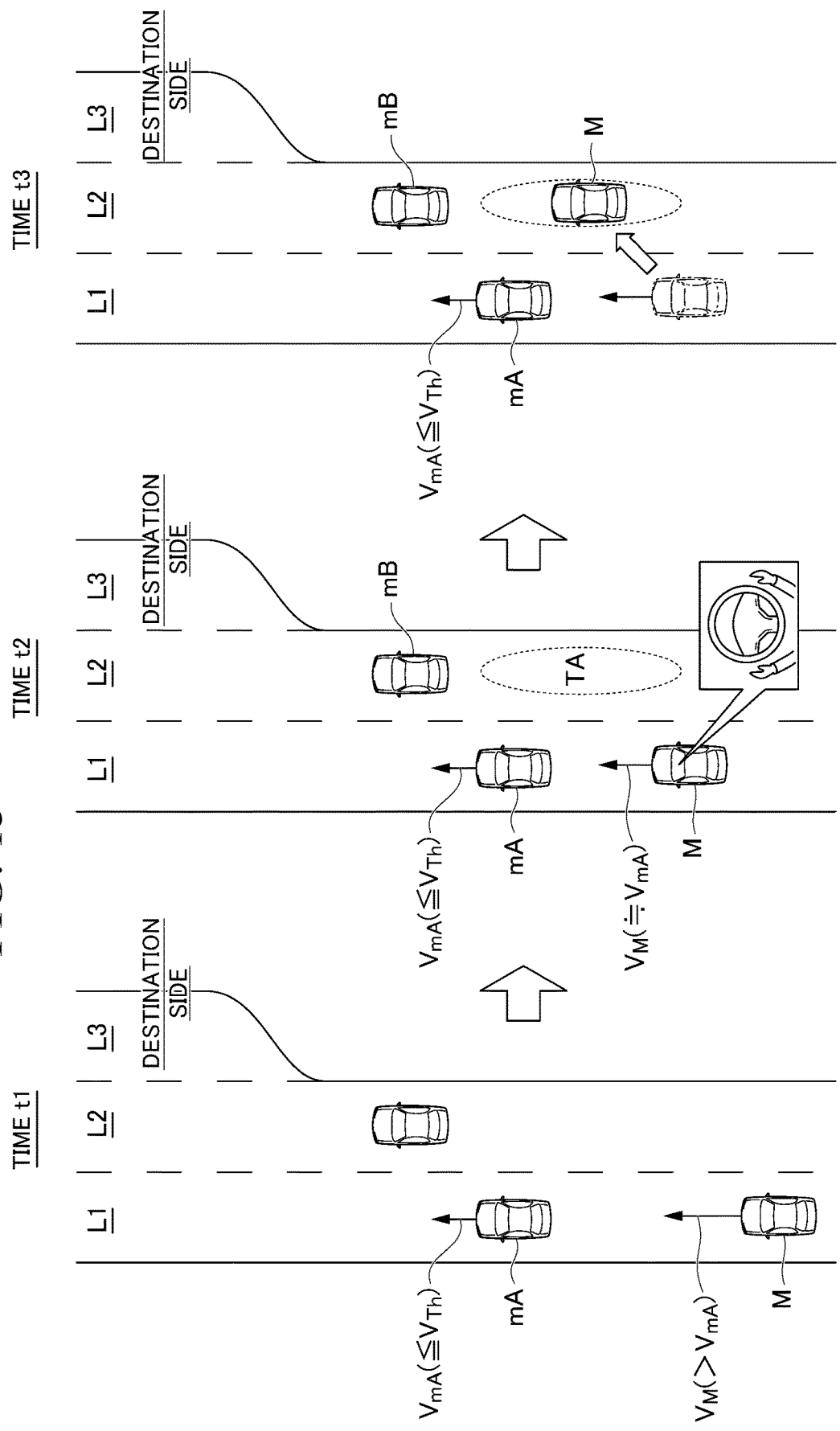
FIG. 13 is a diagram illustrating an example of a scenario in which the automated lane changing is not inhibited at the time of a predetermined event.

FIG. 13 is a diagram illustrating an example of a scenario in which the automated lane changing is not inhibited at the time of a predetermined event. For example, it is assumed that a branching spot is in front of the own vehicle M and the action plan generator 140 plans a branching event. In this case, the inhibition controller 190 determines whether the speed $V_M$ of the own vehicle M is equal to or less than the predetermined speed $V_{Th}$. For example, in a scenario of time t2 after time t1, since the speed $V_M$ of the own vehicle M is equal to or less than the predetermined speed $V_{Th}$, the hands-on by the occupant of the own vehicle M is necessary. In the scenario of time t2, however, the occupant detaches his or her hands from the steering wheel 90a and enters the hands-off state. However, since the branching event is an event which is essential until arrival at the destination, as illustrated in a scenario of time t3, the inhibition controller 190 does not inhibit the automated lane changing in accordance with the branching event and causes the second controller 160 to perform the automated lane changing.

Conversely, when a branching spot or a joining spot is not in front of the own vehicle M and the event is an overtaking event planed due to the front vehicle mA slower than the own vehicle M, the inhibition controller 190 inhibits the automated lane changing as in the above-described first embodiment.

According to the above-described second embodiment, when the own vehicle can arrive at the destination traveling in the own lane without changing the lane, the automated lane changing is inhibited in consideration that another vehicle is traveling from outside of the detection range of the sensor. The automated lane changing is performed without inhibiting the automated lane changing when the own vehicle cannot arrive at the destination unless the lane is changed or when considerable time would be lost before arrival at the destination. Therefore, it is possible to perform the lane changing by preferring to arrive at the destination in accordance with a traveling situation of the lane-changing destination.

[Hardware Configuration]

Figure 14:
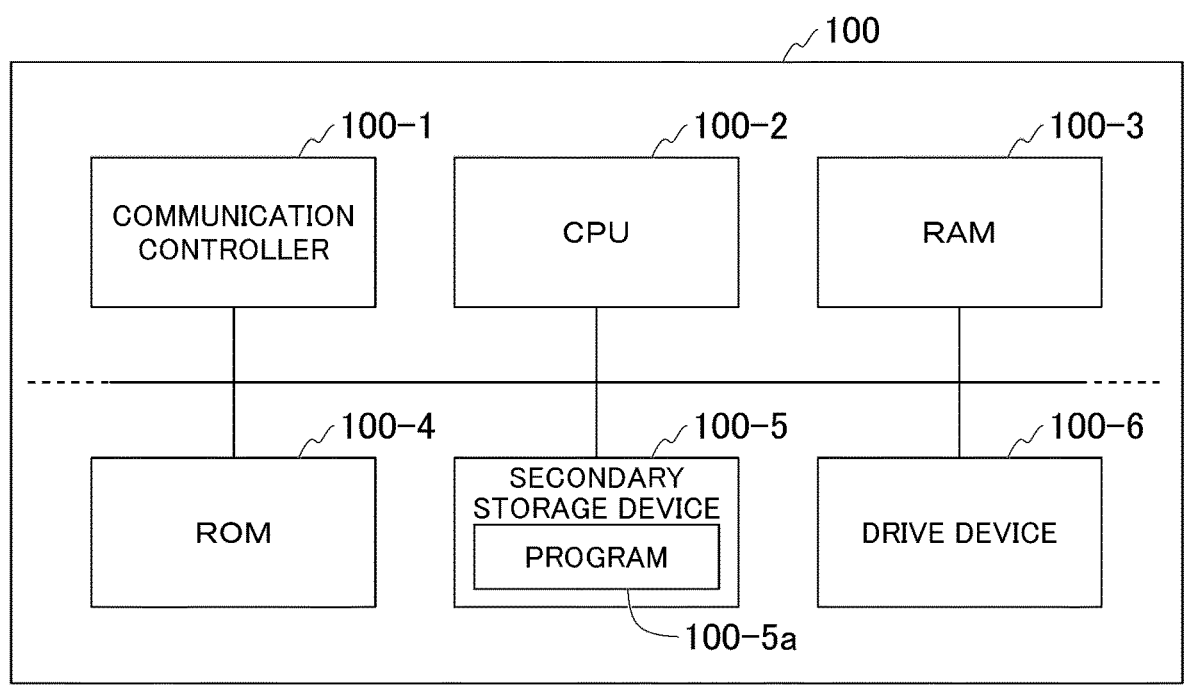
FIG. 14 is a diagram illustrating an example of a hardware configuration of the automated driving controller 100 according to an embodiment.

The automated driving controller 100 according to the above-described embodiments is realized by, for example, a hardware configuration illustrated in FIG. 14. FIG. 14 is a diagram illustrating an example of a hardware configuration of the automated driving controller 100 according to an embodiment.

The automated driving controller 100 is configured such that a communication controller 100-1, a CPU 100-2, a random-access memory (RAM) 100-3 a read-only memory (ROM) 100-4, a secondary storage device 100-5 such as a flash memory or an HDD, and a drive device 100-6 are configured to be connected to each other via an internal bus or a dedicated communication line. A portable storage medium such as an optical disc is mounted on the drive device 100-6. A program 100-5a stored in the secondary storage device 100-5 is loaded on the RAM 100-3 by a DMA controller (not shown) and is executed by the CPU 100-2 to realize the first controller 120, the second controller 160, and the third controller 180. A program which is referred to by the CPU 100-2 may be stored in a portable storage medium mounted on the drive device 100-6 or may be downloaded from another device via a network.

The above-described embodiments can be expressed as follows:

a vehicle control system including a storage that stores information and a processor that executes a program stored in the storage, the processor executing the program to perform:

recognizing a surrounding situation of an own vehicle;

determining whether a condition for lane changing of the own vehicle from an own lane to an adjacent lane is satisfied based on the recognized surrounding situation;

controlling steering and a deceleration or acceleration speed of the own vehicle and performing lane-changing control to change the own lane to the adjacent lane when the condition is determined to be satisfied; and inhibiting the lane-changing control when a speed of the own vehicle is equal to or less than a predetermined speed.

The embodiments for carrying out the present invention have been described above, but the present invention is not limited to the embodiments. Various modifications and substitutions can be made within the scope of the present invention without departing from the gist of the present invention. For example, the vehicle system 1 according to the above-described embodiments may be applied to a system that performs driving support such as auto lane change (ALC).

DESCRIPTION OF REFERENCE NUMERALS

1 Vehicle system
10 Camera
12 Radar device
14 Finder
16 Object recognition device
20 Communication device
30 HMI
30a Lane-changing start switch
40 Vehicle sensor
50 Navigation device
60 MPU
70 Interior camera
80 Turn indicator
90 Driving operator
90a Steering wheel
90b Operation amount detection sensor
90c Touch detection sensor 90d Turn indicator lever
90e Lever operation detection sensor
100 Automated driving controller
120 First controller
130 Recognizer
140 Action plan generator
160 Second controller
162 Second controller side acquirer
164 Speed controller
166 Steering controller
180 Third controller
182 Third controller side acquirer
184 Switching controller
186 HMI controller
188 Occupant state determiner
190 Inhibition controller
200 Travel driving power output device
210 Brake device
220 Steering device

What is claimed is:

1. A vehicle control system, comprising:
an operator operated or grasped by an occupant of an own vehicle; and
a processor configured to execute instructions to:
recognize a surrounding situation of the own vehicle;
determine whether a condition for lane changing of the own vehicle from an own lane to an adjacent lane is satisfied based on the surrounding situation recognized by the recognizer; and
control steering and a deceleration or acceleration speed of the own vehicle and perform lane-changing control to change the own lane to the adjacent lane when the determiner determines that the condition is satisfied,
wherein the processor is configured to further execute instructions to:
  not inhibit the lane-changing control when a speed of the own vehicle is equal to or less than a predetermined speed and a control mode of the own vehicle is a first mode, the first mode being a control mode in which the occupant is requested to operate or grasp the operator; and
  inhibit the lane-changing control when the speed of the own vehicle is equal to or less than the predetermined speed and the control mode of the own vehicle is a second mode, the second mode being a control mode in which the occupant is not requested to operate or grasp the operator.

2. The vehicle control system according to claim 1, wherein the processor is configured to further execute instructions to:
inhibit the lane-changing control by inhibiting determining whether the condition is satisfied when the speed of the own vehicle is equal to or less than the predetermined speed.

3. The vehicle control system according to claim 1, wherein the processor is configured to further execute instructions to:
derive a standard speed serving as a standard of the adjacent lane based on the recognized surrounding situation; and
not inhibit the lane-changing control when a difference between the derived standard speed and the speed of the own vehicle is equal to or less than a threshold.

4. The vehicle control system according to claim 1, further comprising:
a second operator operated or grasped by the occupant of the own vehicle and configured to adjust a movement direction of the own vehicle wherein the processor is configured to further execute instructions to:
detect that the occupant is operating the second operator,
not inhibit the lane-changing control when it is detected that the second operator is being operated or grasped; and
inhibit the lane-changing control when it is not detected that the operator is being operated or grasped.

5. The vehicle control system according to claim 1, wherein the processor is configured to further execute instructions to:
inhibit the lane-changing control until transition of a control mode of the own vehicle from the second mode to the first mode when the control mode of the own vehicle is the second mode, it is determined that the condition is satisfied, and the speed of the own vehicle is equal to or less than the predetermined speed, and
not inhibit the lane-changing control when the control mode of the own vehicle transitions from the second mode to the first mode.

6. The vehicle control system according to claim 1, wherein the processor is configured to further execute instructions to:
detect that the occupant is operating or grasping the operator; and
switch the control mode of the own vehicle between the first and second modes based on at least one of a recognition result for the surrounding situation and a detection result whether or not the operator is operated or grasped by the occupant.

7. The vehicle control system according to claim 1, wherein the processor is configured to further execute instructions to:
determine whether the condition is satisfied under a situation in which another vehicle is located in front of the own vehicle in the own lane when it is recognized that the other vehicle is located in front of the own vehicle in the own lane; and
inhibit the lane-changing control when the condition is satisfied under the situation in which the other vehicle is located in front of the own vehicle in the own lane and the speed of the own vehicle is equal to or less than the predetermined speed.

8. The vehicle control system according to claim 1, wherein the processor is configured to further execute instructions to:
not inhibit the lane-changing control when it is not recognized that other vehicle is located in behind of the own vehicle in the adjacent lane, it is determined that the condition is satisfied, and the speed of the own vehicle more than the predetermined speed;
not inhibit the lane-changing control when it is not recognized that other vehicle is located in behind of the own vehicle in the adjacent lane, it is determined that the condition is satisfied, the speed of the own vehicle is equal to or less than the predetermined speed, and the control mode of the own vehicle is the first mode; and
inhibit the lane-changing control when:
it is not recognized that other vehicle is located behind the own vehicle in the adjacent lane,
it is determined that the condition is satisfied,
the speed of the own vehicle is equal to or less than the predetermined speed, and
the control mode of the own vehicle is the second mode.

9. A vehicle control method causing an in-vehicle computer installed in an own vehicle including an operator operated or grasped by an occupant of the own vehicle to:
recognize a surrounding situation of the own vehicle;
determine whether a condition for lane changing of the own vehicle from an own lane to an adjacent lane is satisfied based on the recognized surrounding situation;
control steering and a deceleration or acceleration speed of the own vehicle and perform lane-changing control to change the own lane to the adjacent lane when the condition is determined to be satisfied;
not inhibit the lane-changing control when a speed of the own vehicle is equal to or less than a predetermined speed and a control mode of the own vehicle is a first mode, the first mode being a control mode in which the occupant is requested to operate or grasp the operator; and
inhibit the lane-changing control when:
the speed of the own vehicle is equal to or less than the predetermined speed, and
the control mode of the own vehicle is a second mode, wherein the second mode comprises a control mode in which the occupant is not requested to operate or grasp the operator.

10. A computer-readable non-transitory storage medium storing a program for causing an in-vehicle computer installed in an own vehicle including an operator operated or grasped by an occupant of the own vehicle to execute:
recognizing a surrounding situation of the own vehicle;
determining whether a condition for lane changing of the own vehicle from an own lane to an adjacent lane is satisfied based on the recognized surrounding situation;
controlling steering and a deceleration or acceleration speed of the own vehicle and perform lane-changing control to change the own lane to the adjacent lane when the condition is determined to be satisfied;
not inhibiting the lane-changing control when a speed of the own vehicle is equal to or less than a predetermined speed and a control mode of the own vehicle is a first mode, the first mode being a control mode in which the occupant is requested to operate or grasp the operator; and
inhibiting the lane-changing control when:
the speed of the own vehicle is equal to or less than the predetermined speed, and
the control mode of the own vehicle is a second mode, wherein the second mode comprises a control mode in which the occupant is not requested to operate or grasp the operator.

* * * * *